(12) United States Patent     (10) Patent No.:   US 12,664,449 B2

Sakae et al.     (45) Date of Patent:    Jun. 23, 2026

(54) SELECTION OF INFERENCE MODELS BASED ON GEOGRAPHIC INFORMATION

(71) Applicant: NEC Corporation, Tokyo (JP)

(72) Inventors: Yoshiaki Sakae, Tokyo (JP); Kazuhiko Isoyama, Tokyo (JP); Jun Nishioka, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 467 days.

(21) Appl. No.: 18/012,472

(22) PCT Filed: Jun. 29, 2020

(86) PCT No.: PCT/JP2020/025563

§ 371 (c)(1),
(2) Date: Dec. 22, 2022

(87) PCT Pub. No.: WO2022/003790

PCT Pub. Date: Jan. 6, 2022

(65) Prior Publication Data

US 2023/0259799 A1     Aug. 17, 2023

(51) Int. Cl.
| | |
|---|---|
| *G07C 5/08* | (2006.01) |
| *G06N 5/046* | (2023.01) |
| *G07C 5/00* | (2006.01) |

(52) U.S. Cl.
CPC ............. *G06N 5/046* (2013.01); *G07C 5/008* (2013.01); *G07C 5/0808* (2013.01); *G07C 5/0825* (2013.01)

(58) Field of Classification Search
CPC ...... G06N 5/046; G07C 5/008; G07C 5/0808; G07C 5/0825; G05B 23/0283; G05B 2223/06; B60R 16/0234
See application file for complete search history.

(56) References Cited

U.S. PATENT DOCUMENTS

| | | | |
|---|---|---|---|
| 11,243,532 B1 * | 2/2022 | Levihn | ................... G06N 3/045 |
| 2014/0052328 A1 | 2/2014 | Nguyen et al. | |

(Continued)

FOREIGN PATENT DOCUMENTS

| | | |
|---|---|---|
| JP | 2005-202762 A | 7/2005 |
| JP | 2010-014498 A | 1/2010 |

(Continued)

OTHER PUBLICATIONS

International Search Report for PCT Application No. PCT/JP2020/025563, mailed on Aug. 11, 2020.

(Continued)

*Primary Examiner* — Kenneth J Malkowski

(74) *Attorney, Agent, or Firm* — Sughrue Mion, PLLC

(57) ABSTRACT

An information processing device 1X mainly includes a selection means 32X and an inference means 35X. The selection means 32X is configured to select, based on one or more geographical center points according to a movement history of an inference target device, one or more adaptive inference models to be used from inference models generated on an area-by-area basis, the inference models making inferences of a state of the inference target device. The inference means 35X is configured to make an inference of the state of the inference target device based on inference results of the adaptive inference models which use data acquired by the inference target device.

16 Claims, 12 Drawing Sheets

(56)            References Cited

U.S. PATENT DOCUMENTS

| | | | |
|---|---|---|---|
| 2019/0385068 A1 | 12/2019 | Takeoka | |
| 2020/0090503 A1* | 3/2020 | Rolf ..................... | G08G 1/0116 |
| 2020/0198651 A1* | 6/2020 | Levy ..................... | G06N 20/00 |
| 2021/0082213 A1* | 3/2021 | Nishida ................ | G07C 5/0808 |
| 2022/0358749 A1 | 11/2022 | Yonetani et al. | |

FOREIGN PATENT DOCUMENTS

| | | | |
|---|---|---|---|
| JP | 2014-089605 A | 5/2014 | |
| JP | 2018-097397 A | 6/2018 | |
| JP | 2019-123351 A | 7/2019 | |
| JP | 2021-022079 A | 2/2021 | |

OTHER PUBLICATIONS

JP Office Communication for JP Application No. 2022-533289, mailed on Feb. 6, 2024 with English Translation.

* cited by examiner

Figures 2A, 2B:
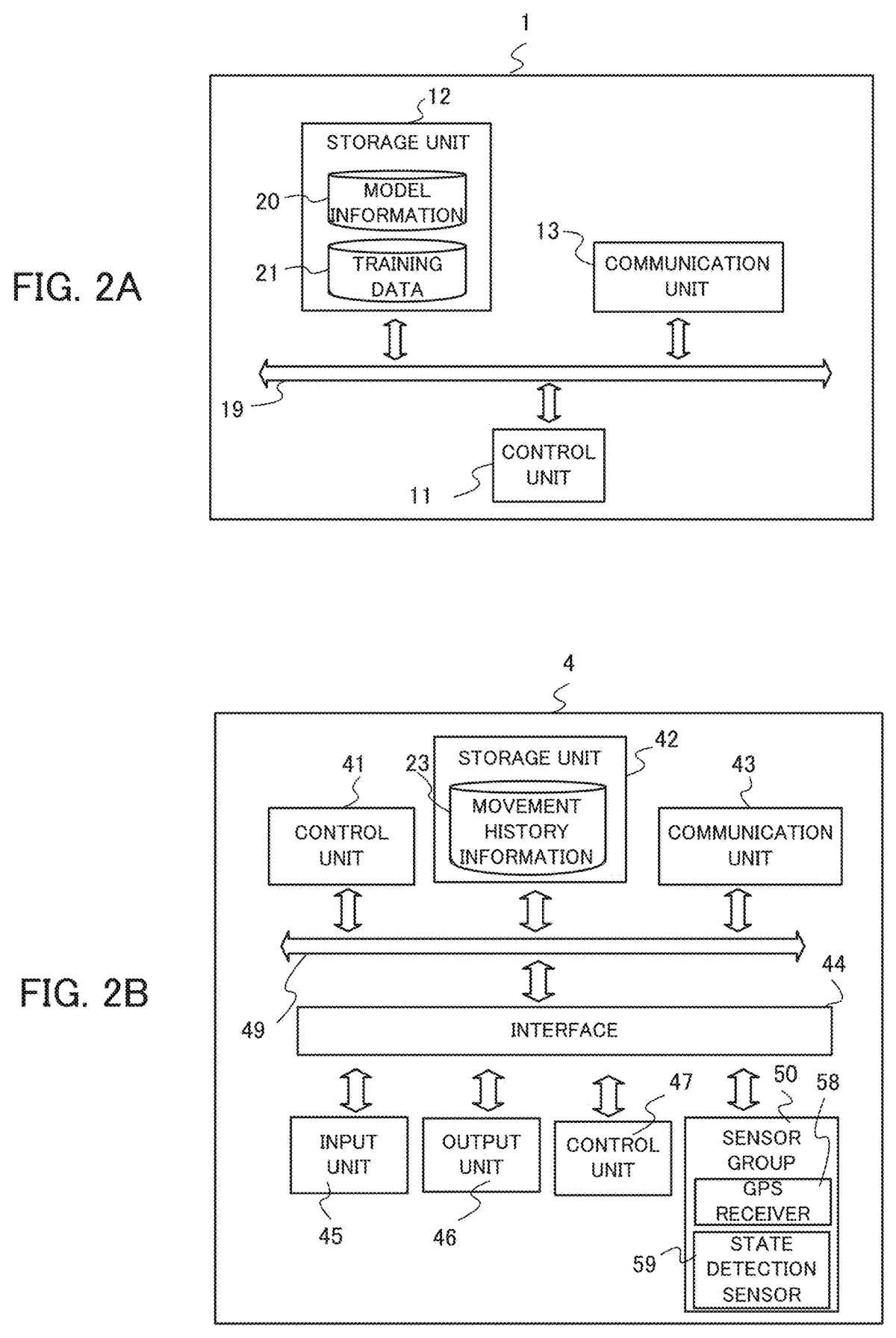

STORAGE UNIT

20 — MODEL INFORMATION

21 — TRAINING DATA

13 — COMMUNICATION UNIT

19

11 — CONTROL UNIT

41 — CONTROL UNIT

23 — STORAGE UNIT 42

MOVEMENT HISTORY INFORMATION

43 — COMMUNICATION UNIT

44

49

INTERFACE

45 — INPUT UNIT

46 — OUTPUT UNIT

47 — CONTROL UNIT 50 58 — SENSOR GROUP

GPS RECEIVER

59 — STATE DETECTION SENSOR

FIG. 10

SELECTION OF INFERENCE MODELS BASED ON GEOGRAPHIC INFORMATION

This application is a National Stage Entry of PCT/JP2020/025563 filed on Jun. 29, 2020, the contents of all of which are incorporated herein by reference, in their entirety.

TECHNICAL FIELD

The present disclosure relates to the technical field of an information processing device, a control method, and a storage media for making an inference of the state of a device subjected to an influence from geographical characteristics.

BACKGROUND ART

There is a technique to make an inference of a malfunction (breakdown) of a moving object such as a vehicle. For example, Patent Literature 1 discloses a vehicle malfunction analysis server which generates rule information for estimating the cause of a malfunction of a target vehicle based on vehicle detection data and repair information which is generated in the same area in the past.

CITATION LIST

Patent Literature

Patent Literature 1: JP 2010-14498A

SUMMARY

Problem to be Solved

When an inference of the state of a device such as a vehicle subjected to an influence from geographical characteristics is made by use of a model generated based on machine learning, such as deep learning, the accuracy can decrease if the environment at the time of learning and is different from the environment at the time of making the inference.

In view of the above-described issue, it is therefore an example object of the present disclosure to provide an information processing device, a control method, and a storage medium capable of suitably making an inference of the state of a device subjected to an influence from geographical characteristics.

Means for Solving the Problem

In one mode of the information processing device, there is provided an information processing device including: a selection means configured to select, based on one or more geographical center points according to a movement history of an inference target device, one or more adaptive inference models to be used from inference models generated on an area-by-area basis, the inference models making inferences of a state of the inference target device; and an inference means configured to make an inference of the state of the inference target device based on inference results of the adaptive inference models which use data acquired by the inference target device.

In one mode of the control method, there is provided a control method executed by a computer, the control method including: selecting, based on one or more geographical center points according to a movement history of an inference target device, one or more adaptive inference models to be used from inference models generated on an area-by-area basis, the inference models making inferences of a state of the inference target device; and making an inference of the state of the inference target device based on inference results of the adaptive inference models which use data acquired by the inference target device.

In one mode of the storage medium, there is provided a storage medium storing a program executed by a computer, the program causing the computer to: select, based on one or more geographical center points according to a movement history of an inference target device, one or more adaptive inference models to be used from inference models generated on an area-by-area basis, the inference models making inferences of a state of the inference target device; and make an inference of the state of the inference target device based on inference results of the adaptive inference models which use data acquired by the inference target device.

Effect

An example advantage according to the present invention is to suitably make an inference of the state of a device subjected to an influence from geographical characteristics.

BRIEF DESCRIPTION OF THE DRAWINGS

FIG. 2A illustrates an example of a block configuration of a data center.

FIG. 2B illustrates an example of the block configuration of an inference target device.

FIG. 10 illustrates a configuration diagram of a functional block of the inference target device according to a third modification.

EXAMPLE EMBODIMENTS

Hereinafter, example embodiments of an information processing device, a control method, and a storage medium will be described with reference to the drawings.

First Example Embodiment

(1) System Configuration

Figure 1:
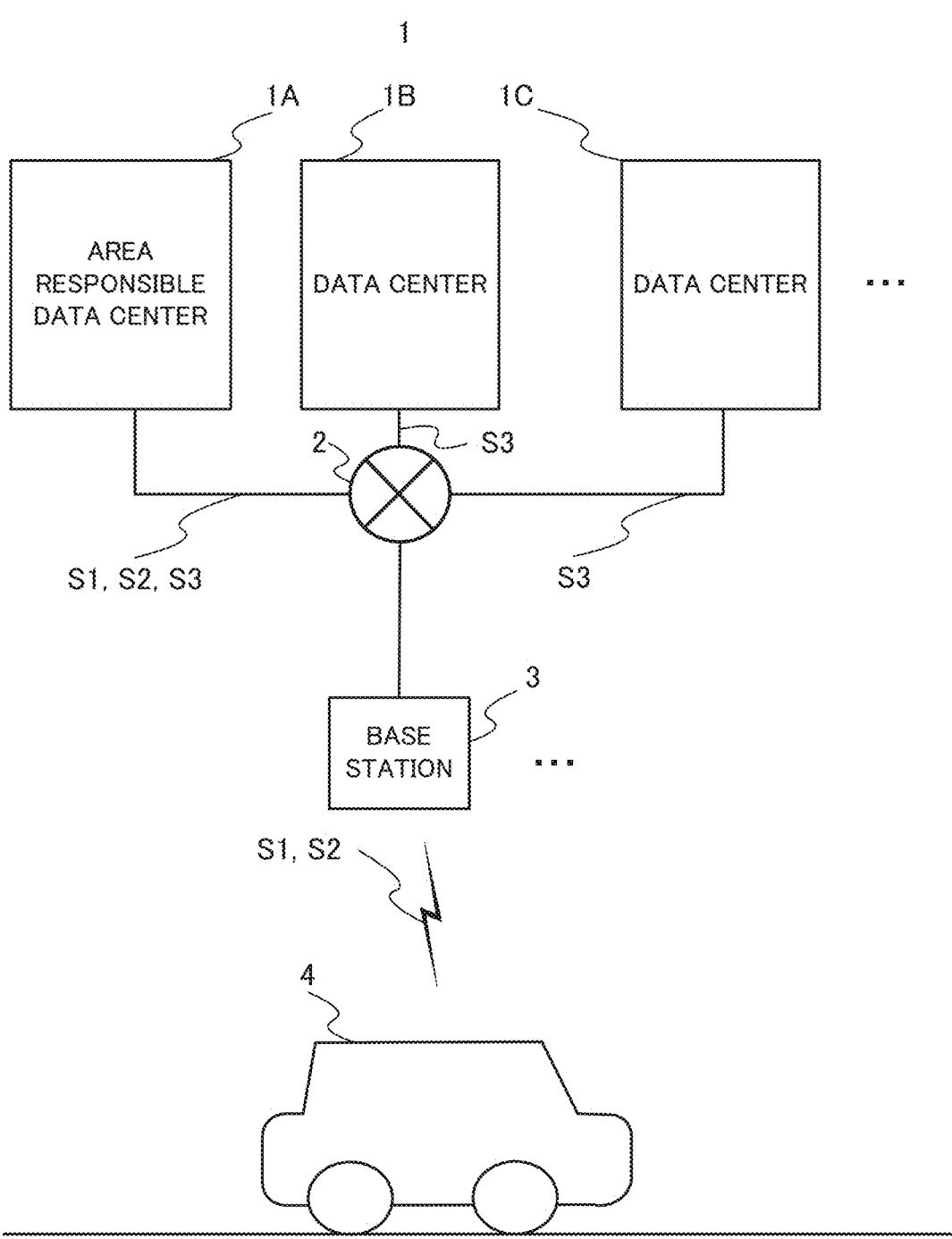
FIG. 1 illustrates a configuration of an inference system according to the first example embodiment.

FIG. 1 shows a configuration of an inference system 100 according to a first example embodiment. The inference system 100 makes an inference of the state of an inference target device 4 (a vehicle in FIG. 1) by using a combination of inference models suitable for respective areas. The inference system 100 has a plurality of data centers 1 (1A to 1C, . . . ), a base station 3, and an inference target device 4. Data communication is performed through the network 2 between any two of the data centers 1 and between the base station 3 and any of the data centers 1.

The data centers 1 are a plurality of devices, and each data center 1 performs data communication with an inference object device present in an area previously designated as an area in charge, and makes an inference of the state of the inference object device. In the following explanation, for convenience, it is assumed that the inference target device 4 exists in the area of which the data center 1A is in charge, and the data center 1A is also referred to as "area responsible data center 1A". The term "areas" hereinafter shall refer to areas virtually partitioned for the purpose of generating inference models, unless otherwise noted.

The area responsible data center 1A make an inference of the state of the inference target device 4 based on request information "S1" for requesting the inference supplied from the inference target device 4, and supplies response information "S2" indicating a response to the request information to the inference target device 4. In addition, each data center 1 has information on an inference model suitable in the assigned area in charge. The area responsible data center 1A receives additional model information "S3" on the inference model(s) required for making an inference of the state of the inference target device 4 from other data centers 1 (1B, 1C) through the network 2. Each data center 1 may be configured by a plurality of devices. The area responsible data center 1A is an example of an "information processing device" in the present disclosure.

One or more base stations 3 are provided for each area of which each data center 1 is in charge, and relays data communication between the data center 1 and the inference target device 4.

The inference target device 4 is a moving body or a mobile device, and is a device subject to an inference such as abnormality detection. In the example of FIG. 1, the inference target device 4 is a vehicle, and inference of the state is performed for the vehicle in whole or individual parts (e.g., an engine, a battery, a suspension, or the like) that are one or more components of the vehicle. Here, examples of the inference of the state include determination of the presence or absence of abnormality of the inference target device 4, classification (e.g., classification of the ongoing malfunction) of the state of the inference target device 4, and calculation of a score representing the state of the inference target device 4. The inference target device 4 is provided with one or more sensors for measuring the state and the position, and the inference target device 4 transmits the request information S1 including the output data generated by the sensors to the area responsible data center 1A via the base station 3. Further, the inference target device 4 performs an output (e.g., display, audio output, or/and control) relating to the inference result on the basis of the response information S2 received from the area responsible data center 1A. The inference target device 4 is not limited to a vehicle, it may be any device subjected to an influence from geographical characteristics such as a smartphone (portable terminal).

Here, a supplemental description will be given of a case where a control is performed as an output relating to the inference result. For example, when the inference target device 4 detects a sign of a malfunction of the driving system in the vehicle as a result of the inference, the inference target device 4 sets an upper limit of the speed that is lower than the speed at the normal time in order to safely reach the nearest maintenance factory. In another example, the inference target device 4 performs driving assistance (navigation or autonomous driving) for the vehicle to reach the nearest maintenance factory when a sign of a malfunction of the driving system is detected in the vehicle as a result of the inference. Accordingly, even when a malfunction of the inference target device 4 occurs, the inference target device 4 can suitably ensure safety by performing control of the inference target device 4 according to the inference result.

(2) Block Configuration

FIG. 2A shows an example of the block configuration of the data center 1. The data center 1 functionally includes a control unit 11, a storage unit 12, and a communication unit 13. The control unit 11, the storage unit 12, and the communication unit 13 are connected via a data bus 19.

The control unit 11 executes a predetermined process by executing a program stored in the storage unit 12. Examples of the control unit 11 include a CPU (Central Processing Unit), a GPU (Graphics Processing Unit), and a quantum processor. The process executed by the control unit 11 will be specifically described with reference to FIG. 3 that is the functional block diagram.

The storage unit 12 is configured by various memories including volatile memories such as RAM (Random Access Memory), and non-volatile memories such as a ROM (Read Only Memory) and a flash memory. The storage unit 12 stores a program for the data center 1 to execute a predetermined process. The program executed by the data center 1 may be stored in a storage medium other than the storage unit 12.

The storage unit 12 includes model information 20, and training data 21. The storage unit 12 stores various kinds of information necessary for process executed by the data center 1 to be described later, such as information on respective areas corresponding to inference models generated on an area-by-area basis by learning, and information on other data centers 1 having information on inference models corresponding to other areas.

The model information 20 is information on an inference model configured to infer the state of the inference target device 4. Here, each data center 1 has model information 20 relating to an inference model suitable for the area of which the each data center 1 is in charge. The inference model suitable for the area is a learning model that is learned on an area-by-area basis based on the training data 21 acquired in the area, and the storage unit 12 stores the learned parameters of the learning model as the model information 20. In this case, the inference model is a learning model that is learned so as to output the inference result on the state of the inference target device when data detected by the inference target device is inputted thereto. Examples of the above-described data is, for example, output data (also referred to as "sensor data") from the sensors provided in the inference target device or/and control data in the inference target device. In a case where the inference target device is a vehicle, examples of the control data include information on the amount of the operation of the brake pedal, information on the amount of operation (throttle openings) of the accelerator pedal, information on the output of the motor or the engine. Further, the inference model outputs, as an inference result, for example, information indicating at least one of the presence or absence of abnormality, type of abnormality, or the score indicating the degree of abnormality.

The training data 21 is data used for learning of the inference model. The generation of the model information 20 and the collection of the training data 21 will be described later with reference to FIGS. 6 and 7.

The communication unit 13 is a communication interface, such as a network adapter, for transmitting and receiving data to and from external devices such as the inference target device 4 by wired or wireless communication under the control of the control unit 11.

The configuration of the data center 1 is not limited to the configuration shown in FIG. 2A. For example, the data center 1 may be connected to or incorporate at least one of an input unit for receiving an input by a user such as an administrator, a display unit such as a display, or a sound output device such as a speaker.

FIG. 2B shows an example of the block configuration of the inference target device 4. The inference target device 4 functionally includes a control unit 41, a storage unit 42, a communication unit 43, an interface 44, an input unit 45, an output unit 46, a control unit 47, and a sensor group 50. Each element of the inference target device 4 is connected to one another via a data bus 49. When the inference target device 4 is a vehicle, each element of the inference target device 4 shown in FIG. 2B may be realized by the vehicle itself, or it may be realized by an onboard device mounted on the vehicle.

The control unit 41 executes a predetermined process by executing a program stored in the storage unit 42. Examples of the control unit 41 include a CPU, a GPU, and a quantum processor. The storage unit 42 is configured by various types of memories including a volatile memory and a non-volatile memory. When the inference target device 4 is a vehicle, the control unit 41 may be an ECU (Electronic Control Unit) of the vehicle, or may be an onboard device for assisting the driving operation of the vehicle. In the latter case, the on-board device may receive various information from ECU of the vehicle using a communication protocol such as CAN (Controller Area Network).

The storage unit 42 is configured by various types of memories including volatile memories and non-volatile memories, and stores a program for the inference target device 4 to execute a predetermined process. The storage unit 42 is used as a working memory. The storage unit 42 stores the movement history information 23. The movement history information 23 is, for example, data in which the position information generated by the inference target device 4 is associated with the time information. The movement history information 23 is updated at constant or undefined intervals during the movement of the inference target device 4. The movement history information 23 is used to calculate geographical center points of the positions where the inference target device 4 has moved during a predetermined time period.

The communication unit 43 is a communication interface, such as a network adapter, for transmitting and receiving data to and from an external device such as the data center 1 by wired or wireless communication under the control of the control unit 41. The interface 44 performs the interface operation among the input unit 45, the output unit 46, the control unit 47 and the sensor group 50.

Examples of the input unit 45 include a button, a switch, a touch panel, and a voice input device. Examples of the output unit 46 include a display device, such as a display and a projector, and a sound output device such as a speaker. The sensor group 50 includes various sensors provided in the inference target device 4, and includes a GPS receiver 58 configured to generate absolute position information, and a state detection sensor 59 provided in the inference target device 4 for detecting the state of the inference target device 4. The state detection sensor 59 measures one or more physical quantities of the inference target device 4 (e.g., voltage, current, speed, force, torque, and vibration quantity). The input unit 45 and the output unit 46 may be external devices that are electrically connected to the inference target device 4 through the interface 44. The interface 44 may perform an interface operation regarding any device other than the input unit 45, the output unit 46, and the sensor group 50. The control unit 47 performs control relating to the driving support of the inference target device 4 when the inference target device 4 is a moving body such as a vehicle. For example, if a sign of a malfunction of the driving system is detected in the vehicle as a result of the inference, the control unit 47 sets the upper limit of the speed that is lower than the speed at the normal time or performs driving support (including navigation and autonomous driving) for the vehicle to reach the nearest maintenance shop under the control of the control unit 41. Accordingly, the control unit 47 imposes a restriction on or perform the driving support on the movement of the inference target device 4 under the control of the control unit 41. For example, when the control unit 41 is an ECU, the control unit 47 may be a vehicle-mounted device, and vice versa.

(3) Functional Block

Next, a detailed description will be given of the process performed by the area responsible data center 1A and the inference target device 4. Schematically, based on geographical center points of the movement history of the inference-target device 4, the area responsible data center 1A selects inference models to be used from the inference models prepared on an area-by-area basis and owned by the data centers 1, and infers the state of the inference-target device 4 based on the inference results by the selected inference models. Hereafter, the geographical center points of the moving history of the inference target device 4 is referred to as "center points Pc", and the inference models selected based on the center points Pc are referred to as "adaptive inference models Ma".

Figure 3:
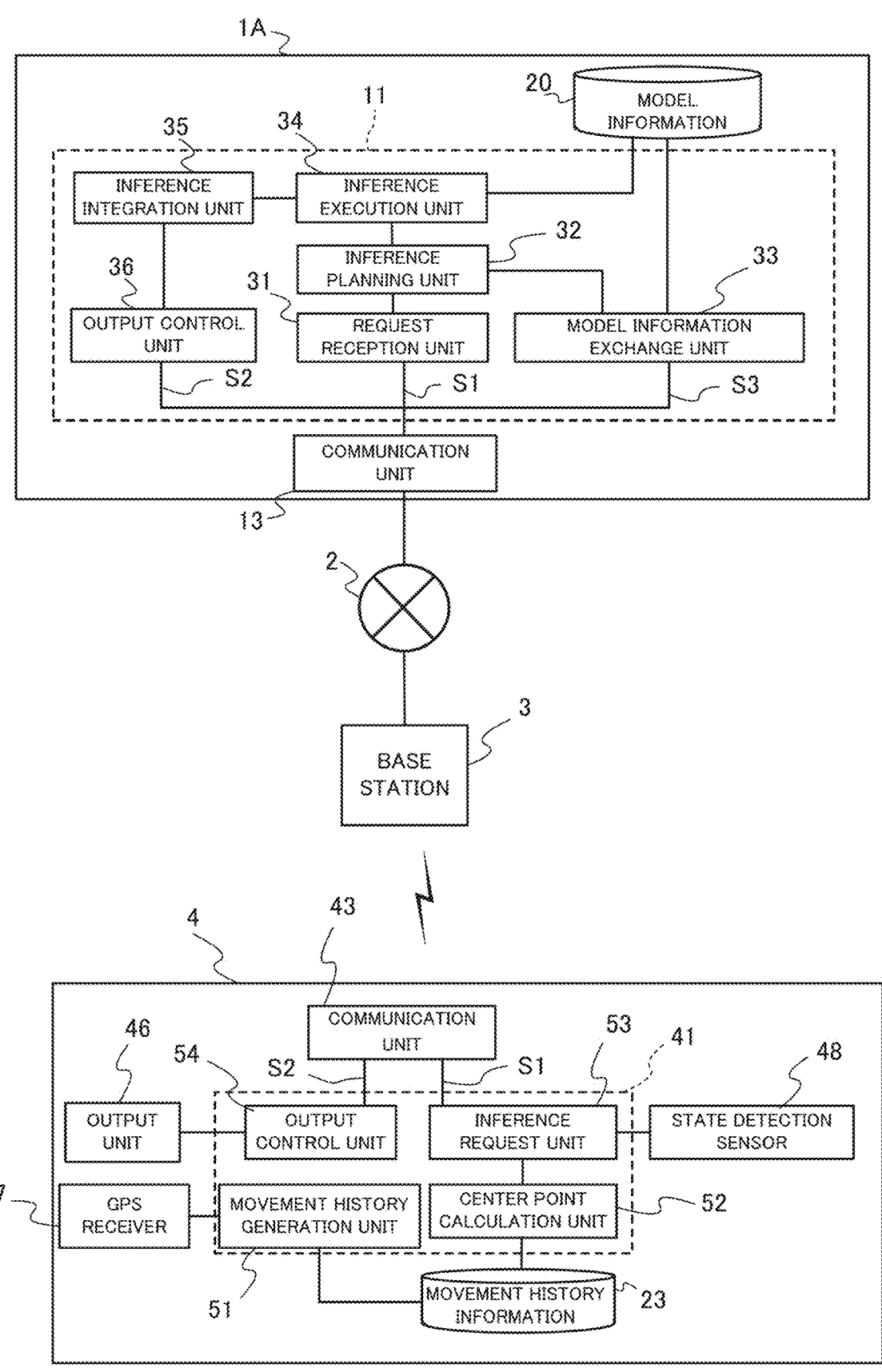
FIG. 3 illustrates an example of a functional block of an inference system.

FIG. 3 is an example of a functional block of the inference system 100. The control unit 11 of the area responsible data center 1A functionally includes a request reception unit 31, an inference planning unit 32, a model information exchange unit 33, an inference execution unit 34, an inference integration unit 35, and an output control unit 36. The control unit 41 of the inference target device 4 functionally includes a movement history generation unit 51, a center calculation unit 52, an inference request unit 53, and an output control unit 54. In FIG. 3, blocks to exchange data with each other are connected by a solid line, but the combinations of blocks to exchange data with each other is not limited to FIG. 3. The same applies to the drawings of other functional blocks described below.

First, each function of the inference target device 4 will be described.

The movement history generation unit 51 identifies the current position of the inference target device 4 based on the output signal from the GPS receiver 58 and stores position information indicating the identified current position as the movement history information 23. Instead of storing all of the generated position information as the movement history information 23, the movement history generation unit 51 may store statistical information based on the generated position information. In this case, for example, the movement history generation unit 51 may store, as the movement history information 23, information on the average value of plural sets of the position coordinates indicated by the position information acquired during the target period of calculation of the center points Pc and information on the number of the records of the position information.

The center point calculation unit 52 calculates the center points Pc by referring to the movement history information 23. In this instance, the center point calculation unit 52 sets plural time periods in which the movement history is to be referred to and calculates the center points Pc for the set plural time periods, respectively. Hereafter, the time period in which the movement history is to be referred to in the calculation of each center point Pc is also referred to as the "center point calculation time period Tpc".

For example, the center point calculation unit 52 sets the time period from the present time (that is, the time point of the ongoing process) to the time a first time length before the present time as a short-term center point calculation time period Tpc, and sets the time period from the present time to the time a second time length before the present time as a middle-term center point calculation time period Tpc, and sets the time period from the present time to the time a third time length before the present time as a long-term center point calculation time period Tpc. Here, it is assumed that the second time length is longer than the first time length and is shorter than the third time length. Then, the center point calculation unit 52 acquires the movement history for each of the short-term, middle-term, and long-term center point calculation time periods Tpc from the movement history data 23, and calculates the center points Pc corresponding to the short-term, middle-term, and long-term center point calculation time periods Tpc, respectively. For example, the center point calculation unit 52 acquires the position information generated in the short-term center point calculation time period Tpc from the movement history information 23 when calculating the center point Pc corresponding to the short-term center point calculation time period Tpc. The center point calculation unit 52 calculates the average of plural sets of the position coordinates (e.g., absolute coordinates such as a combination of latitude and longitude) indicated by the acquired position information as the center point Pc corresponding to the short-term center point calculation time period Tpc.

Here, a supplemental description will be given of the setting of the center point calculation time periods Tpc. The center point calculation time periods Tpc may be set to time periods which are different from each other without any overlaps. For example, the center point calculation unit 52 may set the short-term center point calculation time period Tpc to the time period from the present time to a first day time, set the middle-term center point calculation time period Tpc to the time period from the first day time to a second day time before the first day time, and set the long-term center point calculation time period Tpc to the time period from the second day time to a third day time before the second day time. In addition, the target time period in the calculation of the center point Pc may be determined based on the previous maintenance time of the inference target device 4. In this instance, the center point calculation unit 52 sets the center point calculation time periods Tpc within the period from the previous maintenance time to the present time. In this case, for example, the center point calculation unit 52 recognizes the above-described maintenance time by acquiring information on maintenance of the inference target device 4 from an external device such as the storage unit 42 or the data center 1. Further, for example, initial values of the center point calculation time periods Tpc are stored in the storage unit 42 in advance and they may be appropriately updated based on the user input by the input unit 45. In addition, the number (i.e., the number of center points Pc) of the center point calculation time periods Tpc to be set may be 2 or less, or may be 4 or more.

The inference request unit 53 generates request information S1 for requesting the area responsible data center 1A to make an inference of the state of the inference target device 4 and transmits the request information S1 to the area responsible data center 1A via the communication unit 43. In this instance, the inference request unit 53 generates the request information S1 which includes the center points Pc calculated by the center point calculation unit 52 and the sensor data outputted by the state detection sensor 59 at the present time (i.e., the timing of generating the request information S1). The sensor data is used as input data of an inference model. In addition to or in place of the sensor data described above, the inference request unit 53 may generate the request information S1 which includes control data generated in the inference target device 4. When the inference target device 4 is a vehicle, the above-described control data includes, for example, information on the operation amount of the brake pedal, information on the operation amount of the accelerator pedal (degree of the throttle openings), information on the motor output or the engine output, and the like. The control data is used as input data of an inference model.

The inference request unit 53 may generate the request information S1 at predetermined time intervals, or may generate the request information S1 when detecting an execution instruction based on a user input. In the former case, when an inference is made for each component of the inference target device 4, for example, such information on the time intervals at which inference should be made for each component is stored in the storage unit 42.

The output control unit 54 receives the response information S2 from the area responsible data center 1A through the communication unit 43 and controls the output unit 46 based on the received response information S2. In this case, for example, the response information S2 is display information indicating the inference result regarding the state of the inference target device 4, and the output control unit 54 causes the output unit 46 to display a screen image (also referred to as "inference result screen image") relating to the above-described inference result based on the display information. The inference result screen image will be described later with reference to FIG. 9. Instead of displaying the inference result by the data center 1, the output control unit 54 may notify the user of the inference target device 4 of the inference result by voice or warning sound or the like.

Next, the functions of the area responsible data center 1A will be described.

The request reception unit 31 receives the request information S1 from the inference target device 4 through the communication unit 13 and supplies the received request information S1 to the inference planning unit 32.

The inference planning unit 32 determines adaptive inference models Ma for each center point Pc based on the center points Pc included in the request information S1. In this case, for each center point Pc, the inference planning unit 32 calculates the distance (also referred to as "center point and area distance L") between the each center point Pc and each area where each data center 1 is in charge, and determines adaptive inference models Ma based on the calculated center point and area distance L. In this case, for example, the inference planning unit 32 calculates the distance between the each center point Pc and a predetermined representative point of the each area as the center point and area distance L, and determines the adaptive inference models Ma to be inference models corresponding to top areas in ascending order of the center point and area distance L, wherein the number of the top areas is a predetermined number. Instead of determining the adaptive inference models Ma to be inference models corresponding to top areas in ascending order of the center point and area distance L, the inference planning unit 32 may determine the adaptive inference models Ma to be inference models corresponding to areas whose center point and area distance L is smaller than a threshold value. Information on the position of the above-mentioned representative point, the above-mentioned predetermined number, and the above-mentioned threshold value is stored in the storage unit 12 in advance.

When there is an adaptive inference model Ma that is not registered in the model information 20, the model information exchange unit 33 makes a transmission request through the communication unit 13 to another data center 1 that stores the information on the adaptive inference model Ma for transmitting information on the adaptive inference model Ma. The model information exchange unit 33 receives, via the communication unit 13, additional model information S3 indicating the adaptive inference model Ma that is not registered in the model information 20 as a reply of the above-described transmission request, and updates the model information 20 based on the additional model information S3. When receiving a transmission request to transmit the inference model stored in the model information 20 from another data center 1, the model information exchange unit 33 transmits the additional model information S3 corresponding to the requested inference model to the data center 1 which made the transmission request. Regardless of the process executed by the inference planning unit 32, the model information exchange unit 33 may periodically make a request to the other data center 1 for transmitting the additional model information S3 indicating the newest inference model. In this instance, the model information exchange unit 33 periodically updates the model information 20 based on the additional model information S3 received from the other data center 1 in response to the above-described transmission request.

The inference execution unit 34 configures each adaptive inference model determined by the inference planning unit 32 with reference to the model information 20. Then, the inference execution unit 34 inputs the sensor data or/and the control data of the inference target device 4 included in the request information S1 to the configured each adaptive inference model, thereby to acquire the inference result for the each adaptive inference model Ma. Then, the inference execution unit 34 supplies the acquired inference results outputted by respective adaptive inference models Ma to the inference integration unit 35.

For each center point Pc, the inference integration unit 35 integrates inference results outputted by the respective adaptive inference models Ma and supplied from the inference execution unit 34. Then, the inference integration unit 35 further integrates the inference results integrated for respective center points Pc thereby to generate a final inference result (also referred to as "final inference result") regarding the state of the inference target device 4.

When the inference results outputted by the adaptive inference models Ma are integrated for each center point Pc, the inference integration unit 35 firstly performs the integration by averaging the inference results of the respective adaptive inference models Ma, or by a majority vote. The above integration may be performed based on any method used in ensemble learning. It is noted that the inference integration unit 35 may perform the weighted averaging of the inference results outputted by the adaptive inference models Ma based on the center point and area distance L. In this case, the inference integration unit 35 determines the weight for the inference result outputted by each adaptive inference model Ma so that the weight for the inference result outputted by the each adaptive inference model Ma increases with decreasing center point and area distance L calculated by the inference planning unit 32 for the each adaptive inference model Ma.

The inference integration unit 35 calculates the final inference result by weighting each inference result integrated for each center point Pc based on the length (i.e., the time lengths of the movement history used for calculation) of the center point calculation time period Tpc corresponding to the each center point Pc. In this case, the inference integration unit 35 determines the weight for the inference result of the each center point Pc such that the longer the corresponding center point calculation time period Tpc is, the higher the weight therefor becomes. This weighting process may be based on any approach used in ensemble learning. A specific example of the processing executed by the inference integration unit 35 will be specifically described with reference to FIG. 5.

The output control unit 36 generates response information S2 based on the final inference result generated by the inference integration unit 35 and transmits the generated response information S2 to the inference target device 4 through the communication unit 13. Instead of or in addition to transmitting the response information S2 to the inference target device 4, the output control unit 36 may transmit the response information S2 to a management center that manages the inference target device 4. For example, when the inference target device 4 is a car used for carsharing, there are at least three patterns depending on the content of the final inference result: a pattern that needs to notify the driver; a pattern that needs to notify both the driver and the management center (operation center); and a pattern that needs to notify the management center. In view of the above, the output control unit 36 may determine the destination (receiver) of the response information S2 according to the content of the final inference result. In this instance, for example, the output control unit 36 determines the destination of the response information S2 from the final inference result by referring to a table in which the relation between the content of the final inference result and the destination of the response information S2 is defined in advance.

Each component in the control unit 11 and the control unit 41 described in FIG. 3 can be realized by the control unit 11 and the control unit 41 executing programs stored in the storage unit 12 and the storage unit 42, respectively. Besides, the necessary programs may be recorded on any non-volatile storage medium and installed as necessary to realize each component. Each of these components may be implemented in any combination of hardware, firmware, and software, or the like, without being limited to programmatic software. These components may also be implemented using user programmable integrated circuitry such as, for example, FPGA (Field-Programmable Gate Array) and microcomputers. In this case, the integrated circuit may be used to realize a program for establishing each of the above components. The above is the same in other example embodiments described later.

(4) Specific Examples

Next, a description will be given of specific examples of the processing described in FIG. 3 with reference to FIGS. 4A and 4B and FIG. 5.

Figure 4A:
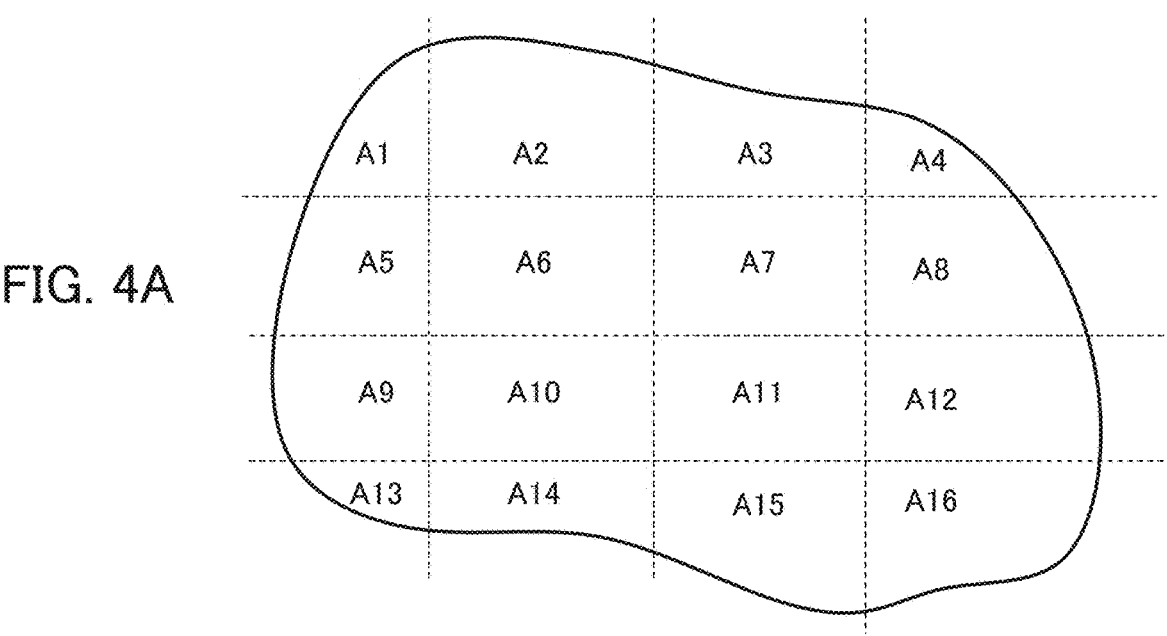
FIG. 4A illustrates a map of an area where the inference model is generated.

FIG. 4A shows a map with a clear indication of each area where an inference model is generated. In FIG. 4A, as an example, there are sixteen grid areas A1 to A16 into which the target continent of the movement of the inference target device 4 is divided in a reticular pattern, and there are data centers 1 corresponding to the areas, respectively. The area partition is not limited to such a grid-like partition, and areas may be partitioned in a nonlinear way so that neighboring points having similar environmental conditions (e.g., air temperature, humidity, other weather conditions, the presence or absence of deserts) affecting the state of the inference target device 4 belong to the same area. Then, the inference models suitable for the area A1 to A16 are learned based on the collected data in the areas A1 to A16, respectively. Learning of the inference model in each area will be described later with reference to FIGS. 6 and 7.

Figure 4B:
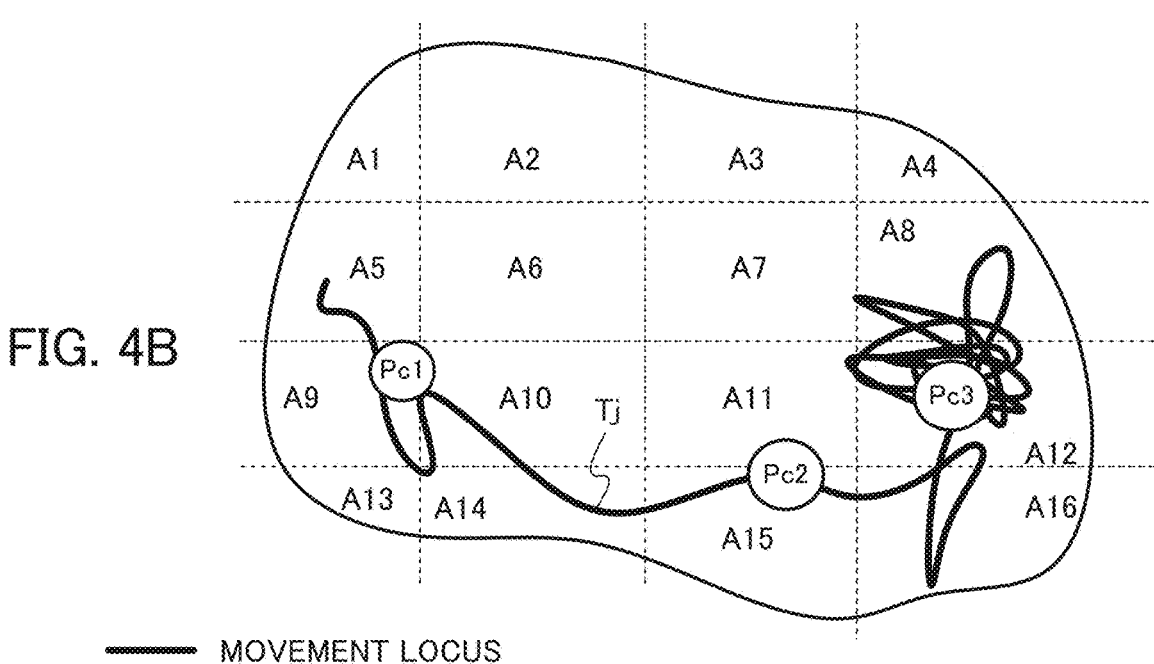
FIG. 4B illustrates a map with clear indication of the movement locus of the inference target device and the center points.

FIG. 4B illustrates a map with a clear indication of the movement locus (trajectory) of the inference target device 4 based on the movement history information 23 stored by the inference target device 4 and the center points Pc (Pc1 to Pc3). In this example embodiment, the inference target device 4 exists in the area A5 at the time of making an inference, and the area responsible data center 1A in charge of the area A5 makes an inference of the state of the inference target device 4 based on the request information S1 received from the inference target device 4.

As an example, the center point calculation unit 52 of the area responsible data center 1A calculates the short-term center point Pc1 that is the center point Pc corresponding to the short-term center point calculation time period Tpc, the middle-term center point Pc that is the center point Pc2 corresponding to the middle-term center point calculation time period Tpc, and the long-term center point Pc that is the center point Pc corresponding to the long-term center point calculation time period Tpc. Here, the time period from the present time to the time one week before is the short-term center point calculation period Tpc, and the period from the present time to the time two weeks before is the middle-term center point calculation period Tpc, and the period from the present time to the time four weeks before is the long-term center point calculation period Tpc. As shown in FIG. 4B, the short-term center point Pc1, the middle-term center point Pc2, and the long-term center point Pc3 belong to different areas, respectively, due to the change in the location of the recent activity.

Figure 5:
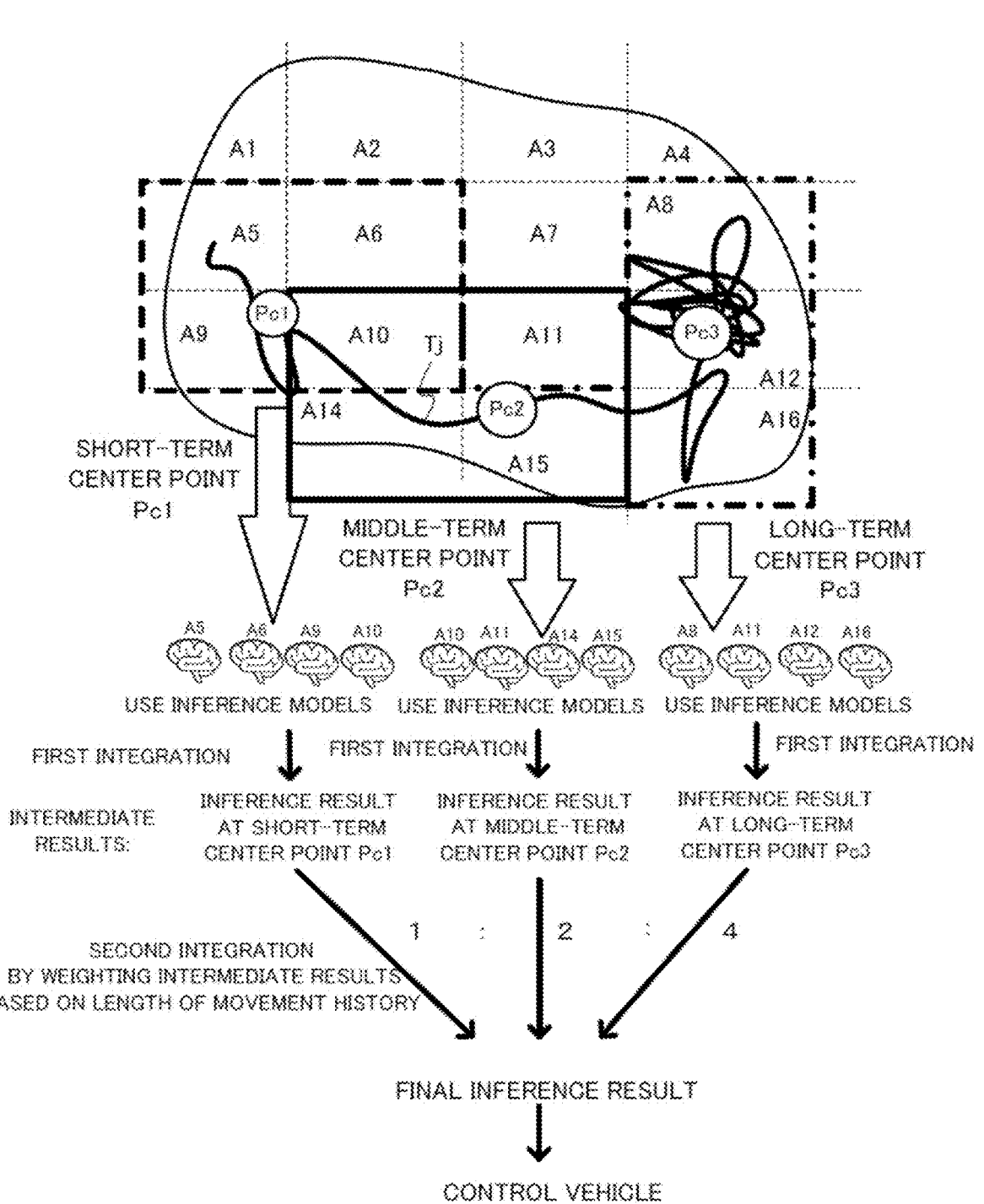
FIG. 5 illustrates an outline of a generation process of a final inference result.

FIG. 5 illustrates an outline of the process of generating the final inference result after the calculation of the short-term center point Pc1, middle-term center point Pc2, and long-term center point Pc3.

First, the inference planning unit 32 of the area responsible data center 1A determines the adaptive inference models Ma corresponding to the short-term center point Pc1, the middle-term center point Pc2, and the long-term center point Pc3, respectively. Here, as an example, it is herein assumed that the inference planning unit 32 selects the adaptive inference models Ma that are top four areas in ascending order of the center point and area distance L. In this instance, the inference planning unit 32 selects, as adaptive inference models Ma for the short-term center point Pc1, inference models corresponding to the top four areas A5, A6, A9, A10 in ascending order of the center point and area distance L with respect to the short-term center point Pc1. In addition, the inference planning unit 32 selects, as adaptive inference models Ma for the middle-term center point Pc2, inference models corresponding to the top four areas A10, A11, A14, A15 in ascending order of the center point and area distance L with respect to the middle-term center point Pc2. Furthermore, the inference planning unit 32 selects, as adaptive inference models Ma for the long-term center point Pc3, inference models corresponding to the top four areas A8, A11, A12, A16 in ascending order of the center point and area distance L with respect to the long-term center point Pc3.

Next, the inference execution unit 34 makes an inference by using each selected adaptive inference model Ma, and, by integrating the inference results for each center point Pc, the inference integration unit 35 generates inference result corresponding to the short-term center point Pc1, an inference result corresponding to the middle-term center point Pc2, and an inference result corresponding to the long-term center point Pc3, respectively.

The inference integration unit 35 further generates a final inference result by integrating the inference results for respective center points Pc by weighting the respective inference results based on the lengths (i.e., the lengths of the center point calculation time periods Tpc) of the time periods of the movement history used for calculation. Since the ratio of the lengths among the short-term center point calculation time period Tpc, the middle-term center point calculation time period Tpc, and the long-term center point calculation time period Tpc is "1:2:4", the inference integration unit 35 integrates the inference results for the respective center points Pc by setting respective weights according to the above ratio. Thus, the area responsible data center 1A can suitably make an inference of the state of the inference target device 4 according to the movement history of the inference target device 4.

(5) Learning

Figures 6, 7:
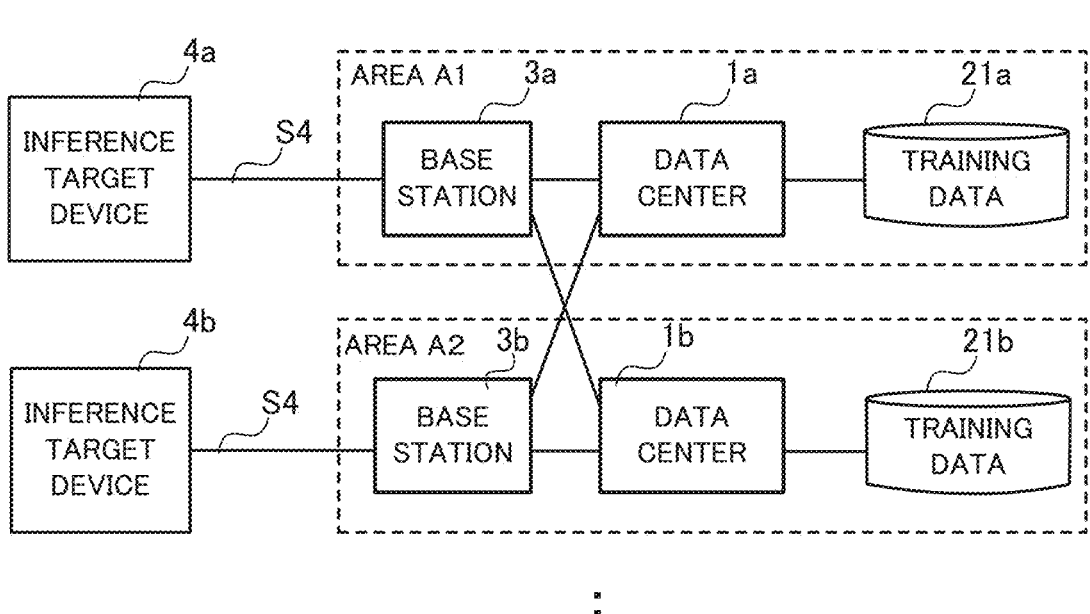
FIG. 6 illustrates an outline of the generation of the training data of the inference model for each area.
FIG. 7 illustrates an outline of learning the inference model corresponding to an area.

Next, the learning of the inference models will be described in detail. FIG. 6 illustrates an outline of generation of training data 21 (21a, 21b, ...) for learning the inference model for each area.

As shown in FIG. 6, the inference target devices 4 (4a, 4b, ...) existing in the respective areas upload the generated sensor data or/and control data through the base stations 3 (3a, 3b, ...) as sample data to be inputted to the inference models at the time of learning. The upload data "S4" to be uploaded by the inference target devices 4 includes, for example, position information at the time of generating the sample data and correct answer labels (i.e., information indicating the correct answer states of the inference target devices 4) specified by user input or the like, in addition to the above sample data. The generation and transmission of the upload data S4 may be performed at the time of maintenance of the inference target devices 4.

The upload data S4 is supplied to the data center 1 (1*a*, 1*b*, . . . ) in charge of the area where the inference target device 4 which sends the upload data S4 is located, and is stored as the training data 21 (21*a*, 21*b*, . . . ). The base station 3 supplies the upload data S4 supplied from an inference target device 4 existing in an area different from the area in which itself is installed to the data center 1 in charge of the area in which the inference target device 4 exists. For example, in such a case where the inference target device 4*a* exists in the area A2 and the nearest base station 3 is the base station 3*a*, the upload data S4 generated by the inference target device 4*a* is supplied to the data center 1*b* through the base station 3*a* based on the position information of the inference target device 4*a*. In this way, the sample data is collected for each area where the inference target device 4 supplying the sample data exists, and is stored as the training data 21.

FIG. 7 illustrates an outline of the learning of the inference model for each area. As shown in FIG. 7, when the inference model corresponding to the area A1 is trained, the machine learning is performed based on the training data 21*a* collected from the inference target device 4 existing in the area A1. This machine learning may be performed by a data center 1*a* in charge of area A1 or may be performed by any other device for performing machine learning. Here, the learning model used for machine learning may be, for example, a learning model such as a decision tree used as a weak learner in ensemble learning, or may be any learning model used for machine learning such as a neural network or a support vector machine. Further, these learning models may be the same in all areas or may be different for each area. Then, through the machine learning described above, the inference model corresponding to the area A1 is learned, and the parameters of the learned inference model are generated as the model information 20*a*. The machine learnings are performed for other areas, respectively.

The inference model may be learned for each type of the inference target devices 4 (for each vehicle type in the case where the inference target devices 4 are vehicles). In this instance, the upload data S4 further includes information on the type of the inference target device 4, and the data center 1 performs the learning of the inference model corresponding to each type of the inference target devices 4 based on the training data 21 collected for each type of the inference target devices 4. In addition, when there are plural components (e.g., an engine, a battery, and the like in the case of a vehicle) to be inferred in the inference target device 4, the inference models may be learned and used for the plural components, respectively.

(6) Output Example

Figure 8:
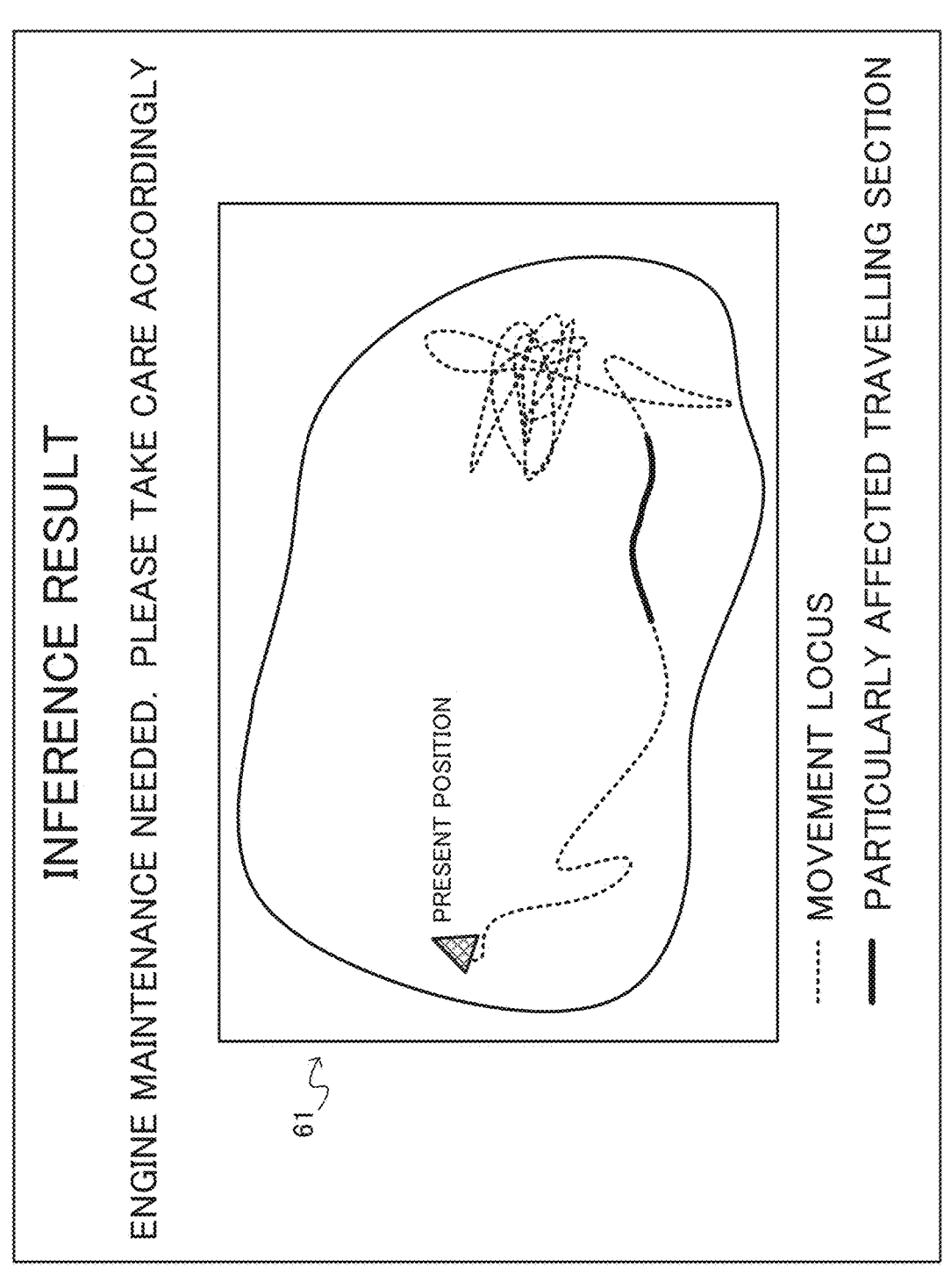
FIG. 8 illustrates a display example of an inference result screen image.

FIG. 8 is a display example of the inference result screen image displayed by the output unit 46 based on the response information S2 when the inference target device 4 has moved as shown in FIG. 4B and FIG. 5. The output control unit 54 of the inference target device 4 displays the inference result screen image on the output unit 46 based on the response information S2 received from the area responsible data center 1A through the communication unit 43.

In this instance, the output control unit 36 of the area responsible data center 1A determines that there is an abnormality of the engine of the inference target device 4 that is a vehicle on the basis of the final inference result, and generates display information for displaying the inference result screen image prompting maintenance of the engine as the response information S2. In this case, for example, the final inference result is a score indicating the degree of abnormality of the engine, and the output control unit 36 determines that there is an abnormality in the engine since the score indicated by the final inference result is equal to or larger than a predetermined threshold value. Then, the output control unit 36 generates the display information for displaying the inference result screen image including the text information indicating that the maintenance of the engine is necessary and the map display area 61. Here, on the map display area 61, the present position of the inference target device 4 and the movement locus of the inference target device 4 based on the movement history of the inference target device 4 for the entire center point calculation time periods Tpc are clearly indicated.

Besides, the output control unit 36 highlights, on the movement locus of the map display area 61, the travelling section (i.e., particularly-affected travelling section) which mainly causes the abnormality by a solid and thick line. Here, a description will be given of a specific example of the above-described method of specifying the above-mentioned travelling section. For example, when the respective inference results of the adaptive inference models Ma include scores each of which indicates the degree of the abnormality, the output control unit 36 identifies the adaptive inference model Ma having the highest score. Then, the output control unit 36 highlights a travelling section existing within an area (here, the area A15 in FIG. 4B) corresponding to the identified adaptive inference model Ma as the travelling section mainly causing the abnormality.

In this way, the output control unit 36 outputs the information on the movement of the inference target device 4 that caused the abnormality to the inference target device 4. Accordingly, the output control unit 36 can suitably visualize information serving as a basis for the abnormality determination.

(7) Processing Flow

Figure 9:
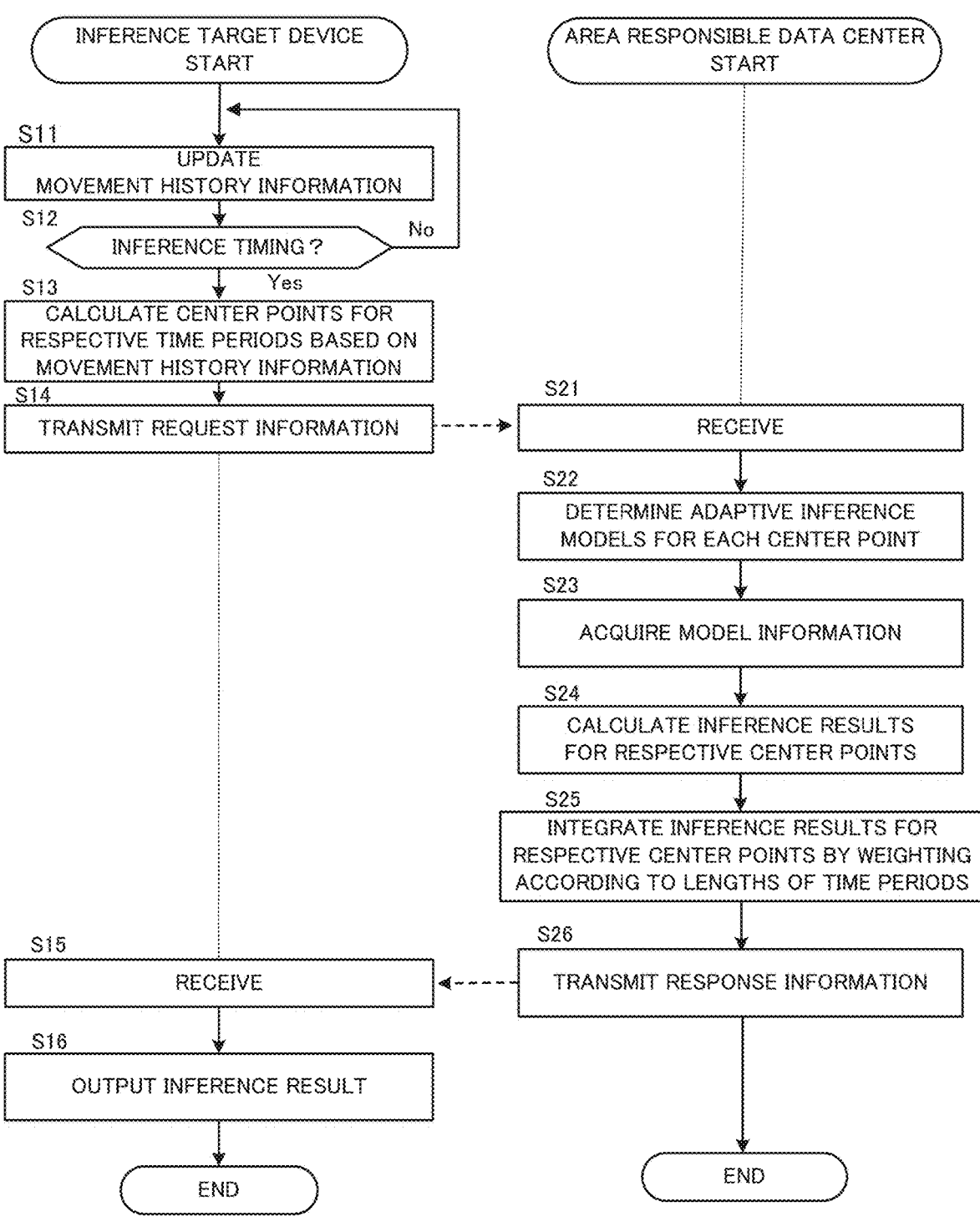
FIG. 9 illustrates an example of a flowchart showing the procedure of the inference process in the first example embodiment.

FIG. 9 illustrates an example of a flowchart of an inference process to be performed by the inference target device 4 and the area responsible data center 1A in the first example embodiment.

First, the inference target device 4 measures the present position based on the output from the GPS receiver 58 and the like, and updates the movement history information 23 based on the measurement result (step S11). Then, the inference target device 4 determines whether or not it is the timing to make an inference of the state of the inference target device 4 (step S12). In this case, when the states of a plurality of components in the inference target device 4 are inference targets and the inference timings are different depending on the respective components, the inference target device 4 determines whether or not it is the timing to make the inference of at least one of the states of the components. Then, when it is determined that it is not the timing to make the inference of the state of the inference target device 4 (step S12; No), the inference target device 4 gets back to the process at step S11.

On the other hand, when it is determined that it is the timing to make the inference of the state of the inference object device 4 (step S12; Yes), the inference object device 4 calculates the center points Pc for respective center point calculation time periods Tpc based on the movement history information 23 (step S13). For example, the inference target device 4 sets plural center point calculation time periods Tpc that are different time periods after the previous maintenance time, and calculates the center points Pc for the center point calculation time periods Tpc, respectively.

Then, the inference target device 4 transmits the request information S1 to the area responsible data center 1A in charge of the area to which the inference target device 4 belongs (step S14). In this instance, the inference target device 4 transmits the request information S1 including the center points Pc calculated at step S13, and the sensor data that is the output data from the state detection sensor 59 and/or the control data in the inference target device 4 to the area responsible data center 1A.

The area responsible data center 1A receives the request information S1 transmitted by the inference target device 4 at step S14 (step S21). Then, the area responsible data center 1A determines the adaptive inference models Ma for each center point Pc based on the center points Pc included in the request information S1 (step S22). Then, the area responsible data center 1A acquires the model information 20 required for configuring the determined adaptive inference models Ma (step S23). Here, when the model information 20 required for configuring the adaptive inference model Ma is insufficient, the area responsible data center 1A updates the model information 20 by receiving the additional model information S3 from other data center(s) 1.

Then, the area responsible data center 1A calculates the inference results for the center points Pc, respectively (step S24). In this case, the area data center 1A calculates the inference results for each center point Pc by using sensor data or/and control data from the inference target device 4 included in the request information S1 as input data of adaptive inference models Ma determined for each center point Pc. In this case, the area responsible data center 1A may obtain the inference results for each center point Pc by combining the adaptive inference models Ma according to any ensemble learning.

Then, the area responsible data center 1A integrates the inference results generated for respective center points Pc by putting weights according to the lengths of the center point calculation time periods Tpc corresponding to the respective center points Pc (step S25). Thereby, the area responsible datacenter 1A generates the final inference result relating to the state of the inference target device 4. Thereafter, the area responsible data center 1A generates the response information S2 based on the final inference result, and transmits the generated response information S2 to the inference target device 4 (step S26).

Then, the inference target device 4 receives the response information S2 transmitted by the area responsible data center 1A at step S26 (step S15). Then, the inference target device 4 outputs the inference result based on the received response information S2 (step S16). The inference target device 4 may output the information at step S16 when it is determined that there is an error (i.e., need for maintenance) based on the response information S2.

(8) Effects

A supplementary description will be given of the effects in the first example embodiment.

In machine learning such as deep learning, when a target object which is supposed to be affected by geographical characteristics like a vehicle is strongly affected by the physical environment, the accuracy of inference could deteriorate due to the difference between the environment at the time of learning and the environment at the time of making the inference. For example, the anomaly detection of a vehicle can be affected by regional characteristics based on environmental factors such as average temperature, desert, high altitude and air pollution degree. On the other hand, if we could acquire data in every environment in advance and make respective learning models, above-mentioned issues would not occur. However, it is not realistic because of the enormous number of combinations of conditions and its labeling cost.

Accordingly, the inference system 100 according to the first example embodiment obtains the geographic center points Pc from the moving history of the inference target device 4 and makes an inference using the inference models corresponding to geographically-neighboring areas for each center point Pc. Then, the inference system 100 calculates the final inference result by weighting the inference results for respective center points Pc based on the lengths of the moving history. In this way, the weight for the inference result of each inference model is set to take into account the length of the movement history of the vehicle. Thereby, it is possible to suitably reduce the calculation cost in comparison with the ensemble learning having a complicated configuration while making such an inference that the accumulation of effects from the environment is considered. Besides, there is no need to collect a large amount of training data for vehicles with similar travel histories.

(9) Modifications

Next, a description will be given of preferred modifications in the first example embodiment. The following modifications may be applied to the above-described example embodiment in any combination.

(First Modification)

Instead of the inference based on the adaptive inference models Ma being made by the area responsible data center 1A in charge of the area where the inference target device 4 exists, the inference may be made by the data centers 1 in charge of the areas corresponding to the adaptive inference models Ma and then the area responsible data center 1A collects the inference results. In this case, for example, in the example shown in FIG. 5, the data centers 1 in charge of the areas A5, A6, A9, A10 execute the inference models corresponding to the area A5, A6, A9, A10 selected based on the short-term center point Pc1, respectively. In this case, the data centers 1 receive input data required for making the inference from the area responsible data center 1A as appropriate.

According to this modification, the calculation load can be suitably distributed among the data centers 1. For example, even when the inference target devices 4 are collectively distributed in a specific area, it is possible to suitably suppress the calculation load for inference execution in the data center 1 existing in the specific area.

(Second Modification)

Instead of providing the data center 1 for each area, one data center 1 may be in charge of a plurality of areas. In this case, each data center 1 is in charge of one or a plurality of areas, and stores model information 20 relating to one or more inference models corresponding to the areas in charge. According to this modification, at least one data center 1 may be present.

(Third Modification)

The inference target device 4 may execute the inference process in place of the area responsible data center 1A.

Figure 10:
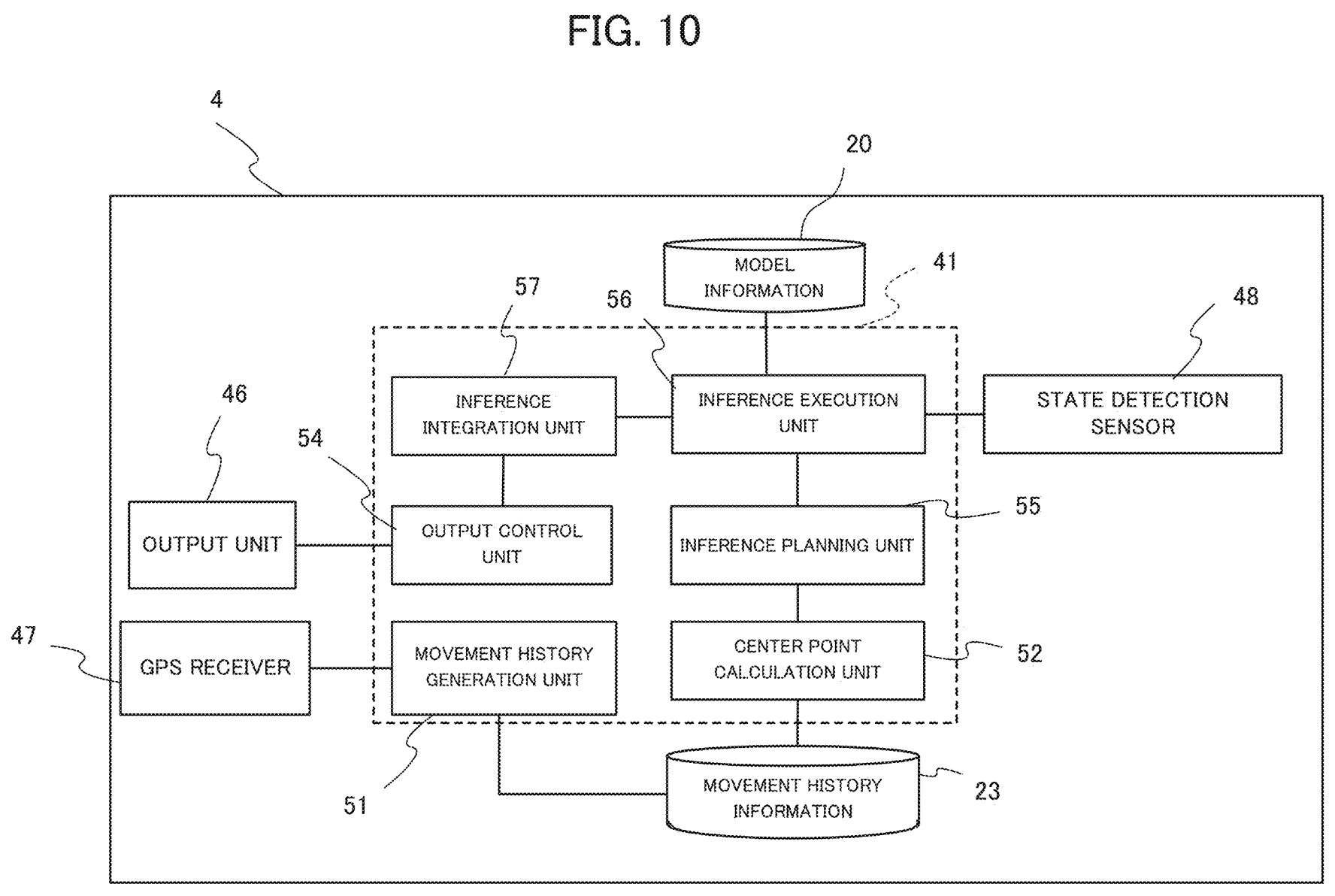

FIG. 10 shows a configuration diagram of a functional block of the inference target device 4 according to the third modification. The control unit 41 of the inference target device 4 functionally includes the movement history generation unit 51, the center point calculation unit 52, the output control unit 54, the inference planning unit 55, the inference execution unit 56, and the inference integration unit 57. Further, the inference object device 4 receives information on the inference models that may be used from the data centers 1 by performing communication with the data centers 1 in advance, and stores the received information in the storage unit 42 as the model information 20.

The inference planning unit 55 performs the same process (i.e., selection of the adaptive inference models Ma) as the process the inference planning unit 32 shown in FIG. 3 does on the basis of the center points Pc calculated by the center calculation unit 52. In addition, the inference execution unit 56 performs the same process as the process the inference execution unit 34 shown in FIG. 3 does, thereby calculating the inference results of the respective adaptive inference models Ma from the sensor data supplied from the state detection sensor 59 or/and the control data in the inference target device 4. Further, the inference integration unit 57 calculates the final inference result by performing the same process as the process the inference integration unit 35 in FIG. 1 does. The output control unit 54 generates information (e.g., display information for displaying the inference result screen image) on the state of the inference target device 4 based on the final inference result, and controls the output of the output unit 46 based on the generated information.

According to the configuration of this modification, it is possible to suppress the transfer of data between the area responsible data center 1A and the inference target device 4 at the time of making an inference, and to suitably realize the improvement of the inference response and the high-frequent implementation of the inference. In this modification, the control unit 41 of the inference target device 4 is an example of an "information processing device" in the present disclosure.

(Fourth Modification)

The area responsible data center 1A may select the adaptive inference models Ma based on the degree of similarity of environmental conditions instead of selecting the adaptive inference models Ma based on the center point and area distance L, which is a physical distance.

In this case, for example, for each calculated center point Pc, the area responsible data center 1A calculates the degree of similarity (also referred to as "environmental similarity") between the environmental conditions at the each calculated center point Pc and the environmental conditions in each area, and selects adaptive inference models Ma based on the environmental similarity. In this case, the area responsible data center 1A may select the inference models corresponding to top areas in descending order of the environmental similarity as the adaptive inference models Ma, or may select the inference models corresponding to the area having the environment similarity which is equal to or larger than a predetermined threshold value as the adaptive inference models Ma, wherein the number of the top areas is a predetermined number. In the calculation of the degree of environmental similarity, for example, the area responsible data center 1A stores in advance index values indicating typical environmental conditions (e.g., mean air temperature, presence/absence of desert, air pollution degree, altitude) for each area. Then, the area responsible data center 1A calculates the environmental similarity for each area using a predetermined equation or a look-up table based on the index values indicating the environmental conditions at the center point Pc or in an area of the center point Pc and the index values indicating the environmental conditions for the each area. The area responsible data center 1A may store in advance information indicating groups of areas grouped to have the same or similar environmental conditions in each group, and select the adaptive inference models Ma that are inference models corresponding to the areas in the group to which the target center point Pc belongs.

Even according to this mode, the area responsible data-center 1A can suitably select the adaptive inference models Ma.

(Fifth Modification)

The data center 1 may perform calculation of the center points Pc in place of the inference target device 4.

Figure 11:
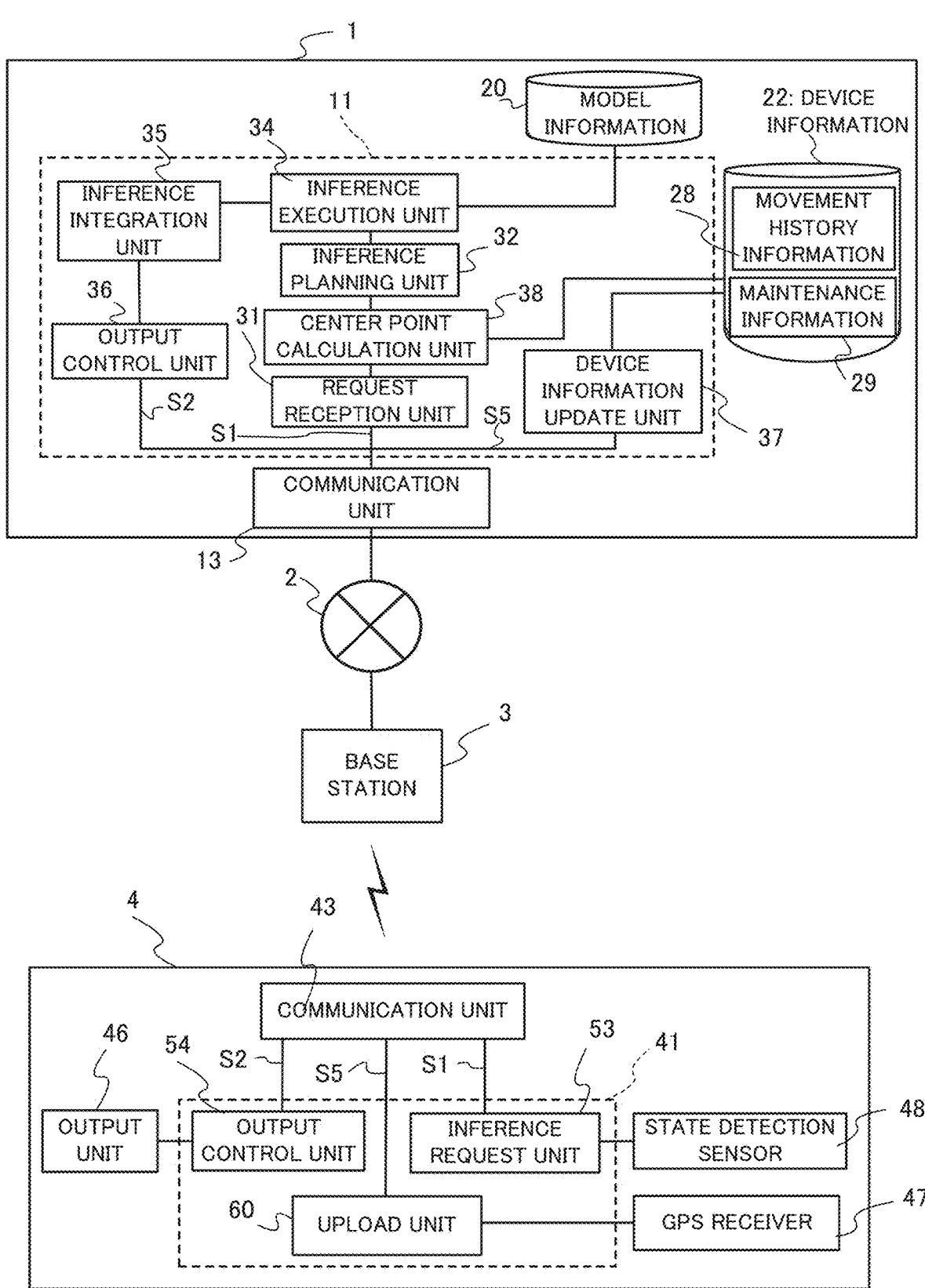
FIG. 11 illustrates a functional block configuration of the data center and the inference target device according to a fourth modification.

FIG. 11 shows a functional block configuration of the data center 1 and the inference target device 4 according to the fourth modification. In this modification, the data center 1 stores the model information 20 relating to the inference models for all areas. The data center 1 stores the device information 22 relating to the inference target device 4.

The device information 22 includes movement history information 28 indicating the movement history of the inference target device 4 and maintenance information 29 relating to the maintenance of the inference target device 4. The movement history information 28 and the maintenance information 29 are updated based on the upload data "S5" transmitted from the inference target device 4.

The control unit 41 of the inference target device 4 functionally includes an upload unit 60, the inference request unit 53, and the output control unit 54. The upload unit 60 transmits the position information of the inference target device 4 measured based on the output from the GPS receiver 58 or the like to the data center 1 through the communication unit 43 as the upload data S5. When maintenance of the inference target device 4 is performed, the upload unit 60 may transmit the upload data S5 indicating the time of maintenance to the data center 1.

The control unit 11 of the data center 1 functionally includes the request reception unit 31, the inference planning unit 32, the inference execution unit 34, the inference integration unit 35, the output control unit 36, a device information update unit 37, and a center point calculation unit 38. When the upload data S5 is received from the inference target device 4, the device information update unit 37 updates the device information 22 based on the upload data S5.

The center point calculation unit 38 calculates the center points Pc based on the device information 22 when the request reception unit 31 receives the request information S1 from the inference target device 4. In this instance, the center point calculation unit 38 refers to the maintenance information 29 and sets a plurality of center point calculation time periods Tpc after the previous maintenance time. The center point calculation unit 38 extracts the movement histories during the set center point calculation time periods Tpc from the movement history information 28 and averages them to calculate the center points Pc for respective center point calculation time periods Tpc. The center point calculation unit 38 supplies the calculated center points Pc, and sensor data or/and control data of the inference target device 4 included in the request information S1 to the inference planning unit 32. Thereafter, the inference planning unit 32, the inference execution unit 34, the inference integration unit 35, and the output control unit 36 perform the processes described in the above-described example embodiment.

In this way, the data center 1 may comprehensively execute the inference process including the calculation of the center points Pc.

(Sixth Modification)

The inference integration unit 35 may determine the weight for the inference result for each center point Pc in further consideration of an element other than the length of the center point calculation time period Tpc.

For example, when the inference target device 4 is a vehicle, the inference integration unit 35 may determine the weight for the inference result for each center point Pc based on the degree of attrition (wear) of the components (tires, suspensions, and the like) attached to the vehicle instead of or in addition to the length of the center point calculation time period Tpc. In this case, for example, the inference target device 4 stores not only the movement history information 23 but also a record of an event (e.g., impact to the vehicle, sudden braking, passage of the sudden curve) in which the attrition of the components occurs. When generating the request information S1, the inference target device 4 includes information on the detection result of the events for each center point calculation time period Tpc in the request information S1. Then, the inference integration unit 35 determines the weight for the inference result for each center point Pc based on the detection result of the events for each center point calculation time period Tpc included in the request information S1. In this case, for example, the inference integration unit 35 increases the weight for the inference result with increasing number of the above-described events which occurred during the corresponding center point calculation time period Tpc. Accordingly, the inference integration unit 35 suitably integrates the inference results for respective center points Pc and can generate the final inference result according to the actual usage state of the inference target device 4.

Second Example Embodiment

Figure 12:
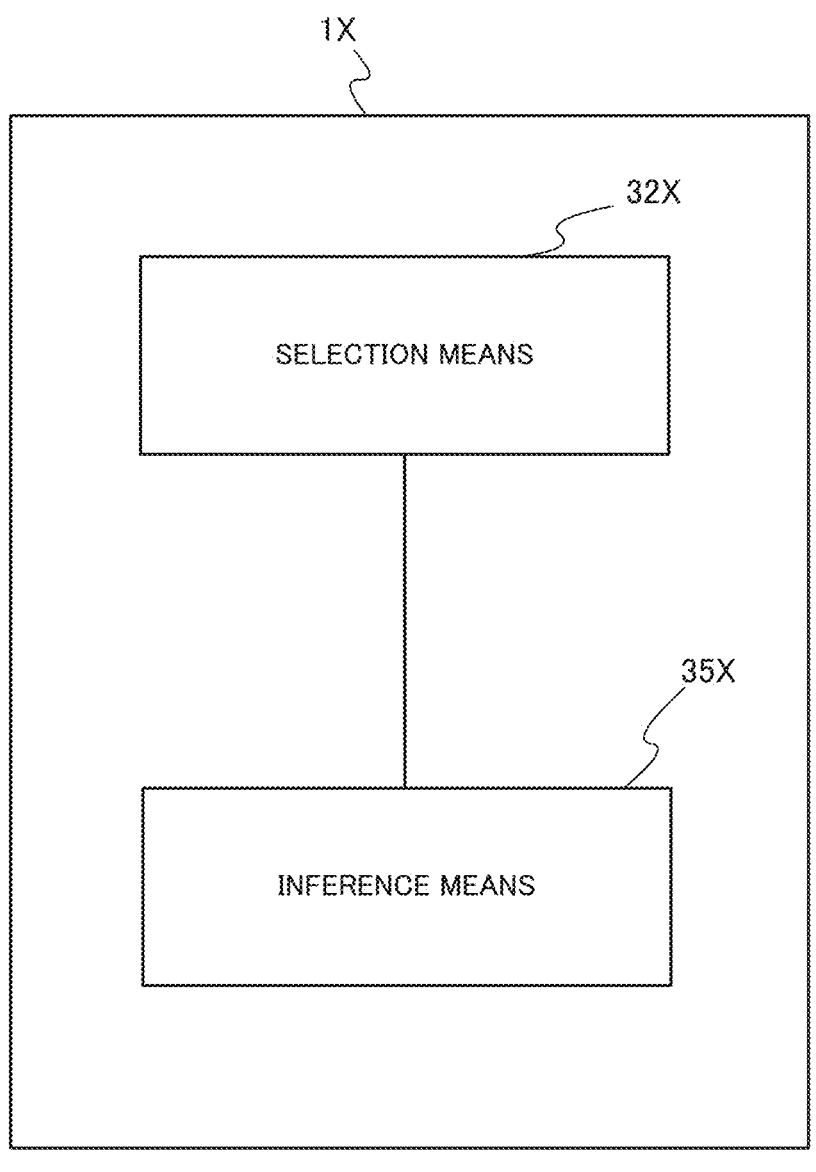
FIG. 12 is a schematic configuration diagram of an information processing device according to a second example embodiment.

FIG. 12 is a schematic configuration diagram of an information processing device 1X according to the second example embodiment. As shown in FIG. 12, the information processing device 1X mainly includes a selection means 32X and an inference means 35X. Examples of the information processing device 1X include the data center 1 in the first example embodiment (excluding the third modification) and the inference target device 4 in the third modification. The information processing device 1X may be configured by a plurality of devices.

The selection means 32X is configured to select, based on one or more geographical center points according to a movement history of an inference target device, one or more adaptive inference models to be used from inference models generated on an area-by-area basis, the inference models making inferences of a state of the inference target device. Examples of the selection means 32X include the inference planning unit 32 and the inference planning unit 55 according to the first example embodiment. Here, the above-mentioned one or more geographical center points may be one or may be more than one. The above-mentioned one or more adaptive inference models may be one or more than one. The information processing device 1X may calculate the above-described center points by itself, or may acquire the information on the center points calculated by any other device.

The inference means 35X is configured to make an inference of the state of the inference target device based on inference results of the adaptive inference models which use data acquired by the inference target device. Examples of the inference means 35X include the inference integration unit 35 and the inference integration unit 57 according to the first example embodiment. The information processing device 1X may generate the inference results of the adaptive inference models using the acquired data in the inference target device by itself, or may acquire the inference results described above from any other device.

Figure 13:
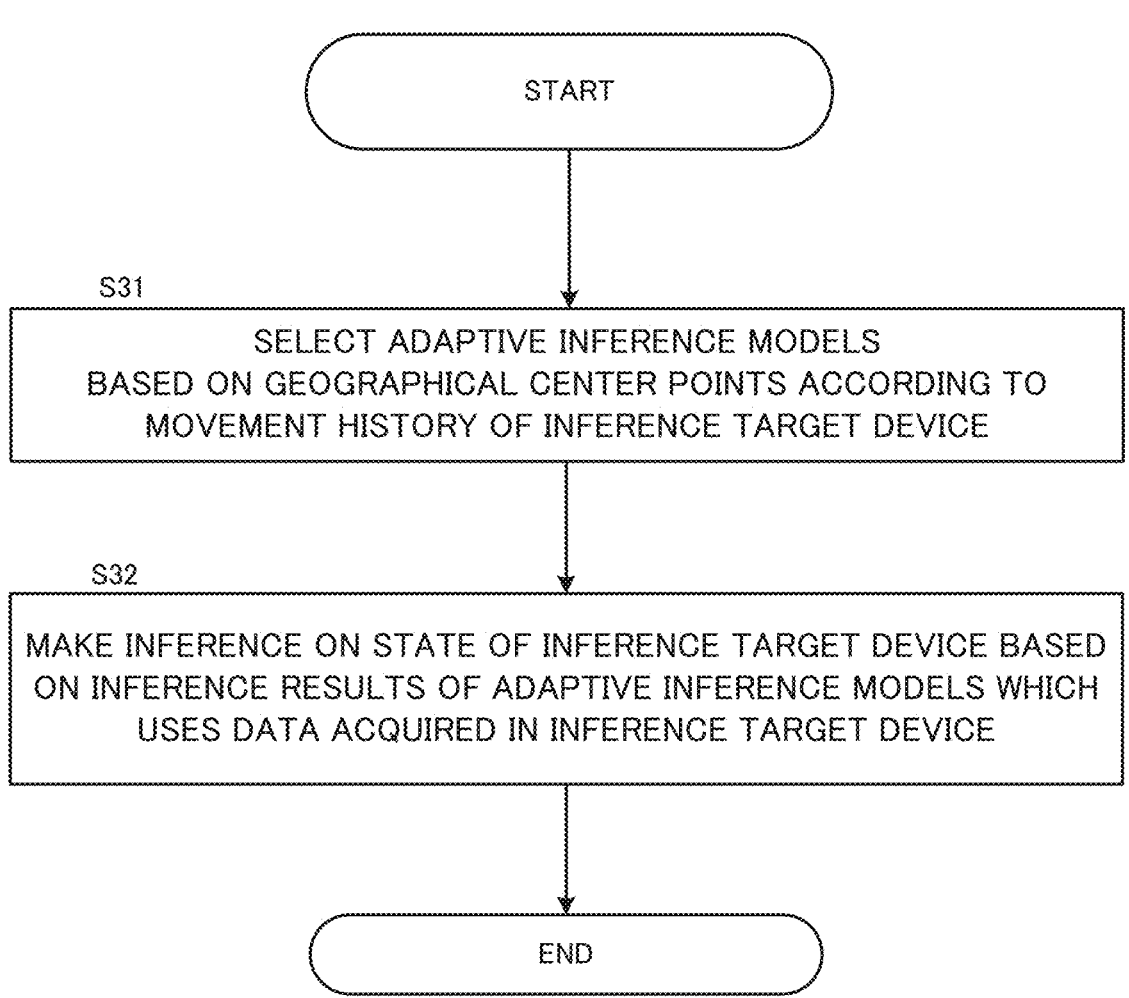
FIG. 13 illustrates an example of a flowchart to be executed by the information processing device according to the second example embodiment.

FIG. 13 illustrates an example of flowchart executed by the information processing device 1X in the second example embodiment. First, the selection means 32X selects, based on one or more geographical center points according to a movement history of an inference target device, one or more adaptive inference models to be used from inference models generated on an area-by-area basis, the inference models making inferences of a state of the inference target device (step S31). Then, the inference means 35X makes an inference of the state of the inference target device based on inference results of the adaptive inference models which use data acquired by the inference target device (step S32).

According to the second example embodiment, the information processing device 1X suitably selects the inference models to be used based on the movement history of the inference target device, thereby suitably making an inference in consideration of the accumulation of influences from the environment.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments (including modifications, the same shall apply hereinafter) described above can be described as, but not limited to, the following Supplementary Notes.

[Supplementary Note 1]

An information processing device comprising:

a selection means configured to select, based on one or more geographical center points according to a movement history of an inference target device, one or more adaptive inference models to be used from inference models generated on an area-by-area basis, the inference models making inferences of a state of the inference target device; and an inference means configured to make an inference of the state of the inference target device based on inference results of the adaptive inference models which use data acquired by the inference target device.

[Supplementary Note 2]

The information processing device according to Supplementary Note 1, wherein the selection means is configured to select the adaptive inference models for each of the center points that are plural, the center points being calculated by using different time periods of the movement history, and wherein the inference means is configured to make the inference of the state of the inference target device by integrating the inference results of the adaptive inference models for each of the center points.

[Supplementary Note 3]

The information processing device according to Supplementary Note 2, wherein the inference means is configured to integrate the inference results of the adaptive inference models for each of the center points by weighting according to lengths of the time periods.

[Supplementary Note 4]

The information processing device according to Supplementary Note 2 or 3, wherein the selection means is configured to select the adaptive inference models that are plural for each of the center points, and wherein the inference means is configured to integrate, for each of the center points, the inference results of the adaptive inference models, and further integrate integrated inference results for the center points.

[Supplementary Note 5]

The information processing device according to any one of Supplementary Notes 2 to 4, wherein the time period is determined within a time period after a previous maintenance for the target inference device.

[Supplementary Note 6]

The information processing device according to any one of Supplementary Notes 1 to 5, wherein the inference models generated on the area-by-area basis are learning models learned on an area-by-area basis based on training data acquired for each area.

[Supplementary Note 7]

The information processing device according to any one of Supplementary Notes 1 to 6, wherein the inference means is configured to perform at least one of abnormality detection of the state, classification of the state, or calculation of a score representing the state as the inference of the state.

[Supplementary Note 8]

The information processing device according to any one of Supplementary Notes 1 to 7, further comprising an output control means configured, when an abnormality of the state is detected, to output information on movement of the inference target device causing the abnormality or perform a control on the inference target device.

[Supplementary Note 9]

The information processing device according to Supplementary Note 8, wherein the output control means is configured to highlight a travelling section causing the abnormality on a movement locus of the inference target device based on the movement history as an output of the information on the movement of the inference target device.

[Supplementary Note 10]

The information processing device according to Supplementary Note 8, wherein the output control means is configured to perform restriction on the movement of the inference target device or driving support as the control on the inference target device.

[Supplementary Note 11]

The information processing device according to any one of Supplementary Notes 1 to 10, wherein the output control means is configured to determine a receiver of the inference result on the state in accordance with the inference result on the state.

[Supplementary Note 12]

The information processing device according to any one of Supplementary Notes 1 to 11, wherein the inference target device is a vehicle, and wherein the inference means is configured to make the inference of the state relating to the vehicle in whole or one or more components of the vehicle.

[Supplementary Note 13]

The information processing device according to any one of Supplementary Notes 1 to 12, wherein the selection means is configured to select the adaptive inference models based on a distance between the center points and each area, or a degree of similarity of environmental conditions therebetween.

[Supplementary Note 14]

The information processing device according to any one of Supplementary Notes 1 to 13, wherein the inference means is configured to acquire, as the data, at least one of output data from a sensor provided in the inference target device or control data generated in the inference target device.

[Supplementary Note 15]

The information processing device according to any one of Supplementary Notes 1 to 14, wherein the information processing device is a part of the inference target device, or one or more external devices configured to make the inference of the state of the inference target device by receiving the data from the inference target device.

[Supplementary Note 16]

A control method executed by a computer, the control method comprising:

selecting, based on one or more geographical center points according to a movement history of an inference target device, one or more adaptive inference models to be used from inference models generated on an area-by-area basis, the inference models making inferences of a state of the inference target device; and making an inference of the state of the inference target device based on inference results of the adaptive inference models which use data acquired by the inference target device.

[Supplementary Note 17]

A storage medium storing a program executed by a computer, the program causing the computer to:

select, based on one or more geographical center points according to a movement history of an inference target device, one or more adaptive inference models to be used from inference models generated on an area-by-area basis, the inference models making inferences of a state of the inference target device; and make an inference of the state of the inference target device based on inference results of the adaptive inference models which use data acquired by the inference target device.

[Supplementary Note 18]

An information processing system comprising:

a selection means configured to select, based on one or more geographical center points according to a movement history of an inference target device, one or more adaptive inference models to be used from inference models generated on an area-by-area basis, the inference models making inferences of a state of the inference target device; and an inference means configured to make an inference of the state of the inference target device based on inference results of the adaptive inference models which use data acquired by the inference target device.

[Supplementary Note 19]

The information processing system according to Supplementary Note 18, wherein the selection means is configured to select the adaptive inference models for each of the center points that are plural, the center points being calculated by using different time periods of the movement history, and wherein the inference means is configured to make the inference of the state of the inference target device by integrating the inference results of the adaptive inference models for each of the center points.

[Supplementary Note 20]

The information processing system according to Supplementary Note 19, wherein the inference means is configured to integrate the inference results of the adaptive inference models for each of center points by weighting according to lengths of the time periods.

[Supplementary Note 21]

The information processing system according to Supplementary Note 17 or 18, wherein the selection means is configured to select the adaptive inference models that are plural for each of the center points, and wherein the inference means is configured to integrate, for each of the center points, the inference results of the adaptive inference models, and further integrate integrated inference results for the center points.

[Supplementary Note 22]

The information processing system according to any one of Supplementary Notes 19 to 21, wherein the time period is determined within a time period after a previous maintenance for the target inference device.

[Supplementary Note 23]

The information processing system according to any one of Supplementary Notes 18 to 22, wherein the inference models generated on the area-by-area basis are learning models learned on an area-by-area basis based on training data acquired for each area.

[Supplementary Note 24]

The information processing system according to any one of Supplementary Notes 18 to 23, wherein the inference means is configured to perform at least one of abnormality detection of the state, classification of the state, or calculation of a score representing the state as the inference of the state.

[Supplementary Note 25]

The information processing system according to any one of Supplementary Notes 18 to 24, further comprising an output control means configured, when an abnormality of the state is detected, to output information on movement of the inference target device causing the abnormality or perform a control on the inference target device.

[Supplementary Note 26]

The information processing system according to Supplementary Note 25, wherein the output control means is configured to highlight a travelling section causing the abnormality on a movement locus of the inference target device based on the movement history as an output of the information on the movement of the inference target device.

[Supplementary Note 27]

The information processing system according to Supplementary Note 25, wherein the output control means is configured to perform restriction on the movement of the inference target device or driving support as the control on the inference target device.

[Supplementary Note 28]

The information processing system according to any one of Supplementary Notes 18 to 27, wherein the output control means is configured to determine a receiver of the inference result on the state in accordance with the inference result on the state.

[Supplementary Note 29]

The information processing system according to any one of Supplementary Notes 18 to 26, wherein the inference target device is a vehicle, and wherein the inference means is configured to make the inference of the state relating to the vehicle in whole or one or more components of the vehicle.

[Supplementary Note 30]

The information processing system according to any one of Supplementary Notes 18 to 27, wherein the selection means is configured to select the adaptive inference models based on a distance between the center points and each area, or a degree of similarity of environmental conditions therebetween.

[Supplementary Note 31]

The information processing system according to any one of Supplementary Notes 18 to 28, wherein the inference means is configured to acquire, as the data, at least one of output data from a sensor provided in the inference target device or control data generated in the inference target device.

[Supplementary Note 32]

The information processing system according to any one of Supplementary Notes 18 to 29, wherein the information processing system is a part of the inference target device, or one or more external devices configured to make the inference of the state of the inference target device by receiving the data from the inference target device.

[Supplementary Note 33]

A control method executed by an information processing system, the control method comprising:

selecting, based on one or more geographical center points according to a movement history of an inference target device, one or more adaptive inference models to be used from inference models generated on an area-by-area basis, the inference models making inferences of a state of the inference target device; and making an inference of the state of the inference target device based on inference results of the adaptive inference models which use data acquired by the inference target device.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1, 1A, 1B, 1C Data center
1X Information processing device
2 Network
3 Base station
4 Inference target device
20 Model information
21 Training data
22 Device information
23 Movement history information
100 Inference system

What is claimed is:

1. An information processing device comprising:

at least one memory configured to store instructions; and at least one processor configured to execute the instructions to:

calculate geographical center points for different time periods of movement history of a vehicle, respectively;

select, a plurality of adaptive inference models for each of the geographical center points, respectively, from inference models generated on an area-by-area basis, the inference models inferring a state of the vehicle;

obtain intermediate inference results by integrating inference results for each of the geographical center points based on the selected adaptive inference models;

obtain a final inference result by weighting the intermediate inference results of each of the geographical center points based on length of history and integrating the weighted intermediate results for each of the geographical center points; and control the vehicle to drive based on the final inference result.

2. The information processing device according to claim 1, wherein the time period is determined within a time period after a previous maintenance for the target inference device.

3. The information processing device according to claim 1, wherein the inference models generated on the area-by-area basis are learning models learned on an area-by-area basis based on training data acquired for each area.

4. The information processing device according to claim 1, wherein the at least one processor is configured to execute the instructions to perform at least one of abnormality detection of the state, classification of the state, or calculation of a score representing the state as the inference of the state.

5. The information processing device according to claim 1, wherein the at least one processor is configured to further execute the instructions, upon detecting an abnormality of the state of the vehicle, to output information on movement of the vehicle causing the abnormality or perform a control on the vehicle.

6. The information processing device according to claim 5, wherein the at least one processor is configured to execute the instructions to highlight a travelling section causing the abnormality on a movement locus of the vehicle based on the movement history as an output of the information on the movement of the vehicle.

7. The information processing device according to claim 5, wherein the at least one processor is configured to execute the instructions to perform restriction on the movement of the inference vehicle support as the control on the vehicle.

8. The information processing device according to claim 1, wherein the at least one processor is configured to execute the instructions to determine a receiver of the inference result on the state in accordance with the inference result on the state.

9. The information processing device according to claim 1, wherein the at least one processor is configured to execute the instructions to infer the state of the vehicle in whole or one or more components of the vehicle.

10. The information processing device according to claim 1, wherein the at least one processor is configured to execute the instructions to select the adaptive inference models based on a distance between each of the center points and one or more areas in which a data center in change of generating inference models is located, or a degree of similarity of environmental conditions between each of the center points and the one or more areas.

11. The information processing device according to claim 1, wherein the at least one processor is configured to execute the instructions to acquire, as the data, at least one of output data from a sensor provided in the vehicle or control data generated in the vehicle.

12. The information processing device according to claim 1, wherein the information processing device is a part of the vehicle, or one or more external devices configured to make the inference of the state of the vehicle by receiving the data from the vehicle.

13. A control method executed by a computer, the control method comprising:

calculating geographical center points for different time periods of movement history of a vehicle, respectively;

selecting, a plurality of adaptive inference models for each of the geographical center points, respectively, from inference models generated on an area-by-area basis, the inference models inferring a state of the vehicle;

obtaining intermediate inference results by integrating inference results for each of the geographical center points based on the selected adaptive inference models;

obtaining a final inference result by weighting the intermediate inference results of each of the geographical center points based on length of history and integrating the weighted intermediate results for each of the geographical center points; and controlling the vehicle to drive based on the final inference result.

14. A non-transitory computer readable storage medium storing a program executed by a computer, the program causing the computer to perform processing comprising:

calculating geographical center points for different time periods of movement history of a vehicle, respectively;

selecting, a plurality of adaptive inference models for each of the geographical center points, respectively, from inference models generated on an area-by-area basis, the inference models inferring a state of the vehicle;

obtaining intermediate inference results by integrating inference results for each of the geographical center points based on the selected adaptive inference models;

obtaining a final inference result by weighting the intermediate inference results of each of the geographical center points based on length of history and integrating the weighted intermediate results for each of the geographical center points; and controlling the vehicle to drive based on the final inference result.

15. The information processing device according to claim 3, wherein the learning models are generated by machine learning based on the training data.

16. The information processing device according to claim 1, wherein the processor is further configured to: generate, based on the inference of the state, information for supporting decision making of a user or a manager regarding maintenance of the vehicle; and output the generated information.

* * * * *